US011991499B2

(12) United States Patent
Hoang et al.

(10) Patent No.: US 11,991,499 B2
(45) Date of Patent: May 21, 2024

(54) HEARING AID SYSTEM COMPRISING A DATABASE OF ACOUSTIC TRANSFER FUNCTIONS

(71) Applicant: Oticon A/S, Smørum (DK)

(72) Inventors: Poul Hoang, Smørum (DK); Jan M. De Haan, Smørum (DK); Michael Syskind Pedersen, Smørum (DK); Jesper Jensen, Smørum (DK)

(73) Assignee: Oticon A/S, Smørum (DK)

( * ) Notice: Subject to any disclaimer, the term of this patent is extended or adjusted under 35 U.S.C. 154(b) by 255 days.

(21) Appl. No.: 17/522,275

(22) Filed: Nov. 9, 2021

(65) Prior Publication Data

US 2022/0174428 A1 Jun. 2, 2022

(30) Foreign Application Priority Data

Nov. 27, 2020 (EP) .................................... 20210249

(51) Int. Cl.
*H04R 25/00* (2006.01)
*G06F 16/61* (2019.01)
*G06N 20/00* (2019.01)

(52) U.S. Cl.
CPC .......... *H04R 25/407* (2013.01); *G06N 20/00* (2019.01); *H04R 25/405* (2013.01);
(Continued)

(58) Field of Classification Search
CPC .. H04R 25/407; H04R 25/405; H04R 25/505; H04R 2225/51; H04R 25/552;
(Continued)

(56) References Cited

U.S. PATENT DOCUMENTS 10,219,083 B2 * 2/2019 Farmani ............... H04R 25/552
10,631,102 B2 * 4/2020 Jensen ................ H04R 25/552
(Continued)

FOREIGN PATENT DOCUMENTS

EP   2928214 A1   10/2015
EP   3253075 A1   12/2017
(Continued)

*Primary Examiner* — Angelica M McKinney
(74) *Attorney, Agent, or Firm* — Birch, Stewart, Kolasch & Birch, LLP

(57) ABSTRACT

A hearing aid microphone system includes M microphones providing corresponding electric input signals. Environmental sound at a given microphone includes a target sound signal propagated via an acoustic propagation channel from a direction to or a location of a target sound source to the microphone, and possible additive noise signals. The acoustic propagation channel is modeled. The hearing aid system includes: a processor connected to the microphones, and a database $\Theta$ having a multitude of dictionaries $\Delta_p$, p=1, . . . , P, where p is a person index, of vectors, termed ATF-vectors, whose elements $ATF_m$, m=1, . . . , M, are frequency dependent acoustic transfer functions representing direction- or location-dependent, and frequency dependent propagation of sound. The processor is configured to, at least in a learning mode of operation, determine personalized ATF-vectors based on the multitude of dictionaries $\Delta_p$, the electric input signals, and the model of the acoustic propagation channels.

20 Claims, 10 Drawing Sheets

(52) U.S. Cl.
CPC .......... *H04R 25/505* (2013.01); *G06F 16/61* (2019.01); *H04R 2225/51* (2013.01)

(58) Field of Classification Search
CPC ...... H04R 25/554; H04R 25/40; H04R 25/60; H04R 2225/43; G06N 20/00; G06F 16/61
See application file for complete search history.

(56) References Cited

U.S. PATENT DOCUMENTS

| | | | | |
|---|---|---|---|---|
| 2006/0075422 | A1* | 4/2006 | Choi | G01S 3/7864 |
| | | | | 725/18 |
| 2015/0163602 | A1* | 6/2015 | Pedersen | H04R 25/43 |
| | | | | 381/315 |
| 2018/0262849 | A1* | 9/2018 | Farmani | H04R 25/407 |
| 2018/0359572 | A1* | 12/2018 | Jensen | H04R 25/407 |

FOREIGN PATENT DOCUMENTS

| | | |
|---|---|---|
| EP | 3285501 A1 | 2/2018 |
| EP | 3413589 A1 | 12/2018 |

\* cited by examiner

HEARING AID SYSTEM COMPRISING A DATABASE OF ACOUSTIC TRANSFER FUNCTIONS

BACKGROUND

Estimation of absolute or relative acoustic transfer functions (AATFs or RATFs) is important for a proper function of algorithms in hearing devices, e.g. in order to adapt a beamformer towards a signal source of interest. EP3413589A1 describes a "dictionary method" for estimating relative acoustic transfer functions.

SUMMARY

In the present disclosure, an extension of the concept of EP3413589A1 is proposed, which may a) lead to better estimation performance, b) reduce computational complexity when searching the dictionary, and c) derive information about hearing aid users' head characteristics and/or position of the hearing aid on the ear of the user (which may be beneficial for other algorithms, e.g. microphone position equalization, etc.).

A First Hearing Aid System:

In an aspect of the present application, a first hearing aid system comprising a hearing aid configured to be worn on the head at or in an ear of a user is provided. The hearing aid may comprise a microphone system comprising a multitude of M of microphones arranged in said hearing aid, where M is larger than or equal to two, the microphone system being adapted for picking up sound from the environment and to provide M corresponding electric input signals $x_m(n)$, m=1, ..., M, n representing time, the environment sound at a given microphone comprising a mixture of a target sound signal $s_m(n)$ propagated via an acoustic propagation channel from a direction to or a location ($\theta$) of a target sound source to the $m^{th}$ microphone of the hearing aid when worn by the user, and possible additive noise signals $v_m(n)$ as present at the location of the $m^{th}$ microphone, wherein the acoustic propagation channel is modeled as $x_m(n)=s_m(n)h_m(\theta)+v_m(n)$ and wherein $h_m(\theta)$ is an acoustic impulse response for sound for that acoustic propagation channel.

The hearing aid system may comprise a processor connected to said number of microphones, and a database $\Theta$ comprising a dictionary $\Delta_{p'}$ of vectors, termed ATF-vectors, whose elements $ATF_m$, m=1, ..., M, are frequency dependent acoustic transfer functions representing direction- or location-dependent ($\theta$), and frequency dependent (k) propagation of sound from a direction or location ($\theta$) of a target sound source to each of said M microphones, k being a frequency index, k=1, ..., K, where K is a number of frequency bands, when said microphone system is mounted on a head at or in an ear of a natural or artificial person (p'), and wherein said dictionary $\Delta_{p'}$ comprises ATF-vectors for said person (p') for a multitude of different directions or locations $\theta_j$, j=1, ..., J, relative to the microphone system; and wherein said ATF vectors of said dictionary $\Delta_{p'}$ are hearing aid-orientation specific, and wherein said dictionary $\Delta_{p'}$ comprises ATF vectors for a multitude of different hearing aid-orientations $\varphi_q$, q=1, ..., Q, on the head of said person (p'), for said multitude of different directions or locations $\theta_j$, j=1, ..., J.

The processor may be configured to determine personalized ATF-vectors $ATF^*_{\theta^*,\varphi^*,p'}$ for said user based on said database $\Theta$, said electric input signals $x_m(n)$, m=1, ..., M, and said model of the acoustic propagation channels.

Thereby an improved hearing aid system may be provided.

In the term 'direction to or location' the term 'direction' is taken to mean different locations with the same angle relative to the hearing aid user (e.g. a direction of the nose) (which may lead to roughly same acoustic transfer functions (ATF), if at sufficient distance to user).

The personalized ATF-vector $ATF^*_{\theta^*,\varphi^*,p'}$ for the given acoustic situation (defined by the given electric input signals picked up by the microphone system) may thus comprise frequency dependent (k=1, ..., K) acoustic transfer functions for each microphone (m=1, ..., M) from the dictionary for a given (natural or artificial) person p' (for which the dictionary $\Delta_{p'}$ has been created) for a specific direction/location $\theta^*$ to the target sound source and for a specific hearing aid orientation $\varphi^*$.

The number (J) of specific directions/locations ($\theta_j$) of the sound source relative to the microphones of the hearing aid (for each of which an acoustic transfer function may be present in the dictionary $\Delta_{p'}$ of the database $\Theta$) may be any number larger than or equal to two, e.g. in the range between two and twenty-four, e.g. between four and sixteen.

The number (Q) of specific hearing aid orientations ($\varphi_q$) on the user's head (for each of which an acoustic transfer function may be present in the dictionary $\Delta_{p'}$ of the database $\Theta$) may be any number larger than or equal to two, e.g. in the range between two and eight, e.g. three or four.

The processor may thus be configured to determine (e.g. select) a personalized ATF-vector $ATF^*_{\theta^*,\varphi^*,p'}$ for said user (from the dictionary $\Delta_{p'}$ of the database $\Theta$) for a given acoustic situation defined by the electric input signals $x_m$, m=1, ..., M, the vector $ATF^*_{\theta^*,\varphi^*,p'}$ comprising elements $ATF^*_m(\theta^*,\varphi^*,p',k)$, m=1, ..., M, i.e. one for each microphone. The personalized ATF-vector $ATF^*_{\theta^*,\varphi^*,p'}$ is determined from the dictionary $\Delta_{p'}$ for a given natural or artificial person p' and may thus provide information about an estimated direction/location $\theta^*$ to the target sound source, and an estimate of the current orientation $\varphi^*$ of the hearing aid in question on the user's head. This information may be used as inputs to other parts of the hearing aid, e.g. to a signal processor for applying processing algorithms to one or more signals of the forward path, e.g. to a beamforming algorithm (see e.g. ATF*, p*, $\theta^*$, $\varphi^*$ as inputs to the processor (SP) in FIG. 3, or $d^*_\theta$, $\theta^*$ as inputs to the beamformer filter (BF) in FIG. 4).

A direction to or a location ($\theta$) of a target sound source relative to the hearing aid (or more specifically, to the microphone system) may e.g. be to a reference microphone (m=i) among the M microphones of the microphone system (see e.g. FIG. 1C ($M_{1L}$, $M_{1R}$)). The model $x_m(n)=s_m(n)h_m(\theta)+v_m(n)$ of the acoustic propagation channels of sound from a direction to or a location ($\theta$) of a target sound source to the $m^{th}$ microphone of the hearing aid when worn by the user may be translated to the frequency domain as $X_m(k,l)=S_m(k,l)H_m(\theta,k)+V_m(k,l)$, where $Z_m(k,l)$ (Z=X, S, H, V) is the frequency domain version (e.g. Fourier transform, e.g. a short time Fourier transform (STFT)) of the corresponding time-domain representation $z_m(n)$, l being a time index, e.g. a time-frame index, Z (z) being either X (x) (noisy signal), S (s) (target signal), H (h) (propagation channel response) or V (v) (noise) in the model of the acoustic propagation channel $H_m(\theta,k)$ represents an (absolute) acoustic transfer function of sound from a sound source 'at θ' to the $m^{th}$ microphone of the microphone system of the hearing aid.

The multitude of M of microphones may be arranged in a predefined geometric configuration. The term 'a predefined geometric configuration' may e.g. include that the microphones are located in a housing of a hearing aid (e.g. in a BTE part or in an ITE-part, or in a BTE-part and in an ITE-part with a relatively constant mutual arrangement provided by a connecting element (e.g. a tube or a cable adapted to the user's physiognomy) when mounted on the user).

The term 'a natural or artificial person' may be understood to cover real persons as well as artificial persons (e.g. based on physical or computer models of human head and torso), or prototypes of such persons. A 'natural person' refers to a human being, e.g. (but typically not) including the user. An 'artificial person' may e.g. be a model, e.g. the Head and Torso Simulator (HATS) 4128C from Briiel & Kjer Sound & Vibration Measurement A/S, or the head and torso model KEMAR from GRAS Sound and Vibration A/S, or similar, e.g. a computer model of the acoustic propagation properties of a person. An 'artificial person' may e.g. be characterized by "average head characteristics", e.g. arising by combining several measured characteristics of real humans. Such "average head characteristics" or "prototype heads" may be useful, when one tries to represent as many real heads as possible with as small database as possible a small database is desirable for computational complexity (search) reasons and memory complexity (storage) reasons (e.g. for use in a low-power device, such as a hearing aid). For example, one might represent all females with a single female "prototype" head, and similarly for male and children. In general, one would populate the database with several "prototype heads". Different head characteristics may e.g. include head (size, form), ear (size, form, location), nose (size, form, location), hair style, shoulders (form and size), etc.

The frequency dependent acoustic transfer functions $ATF_m$ may be absolute or relative, i.e., acoustic transfer functions from a source position to different microphones, sampled at a particular frequency, divided by the acoustic transfer function from the source position to a particular microphone (a reference microphone), at the same frequency.

The hearing aid may comprise a BTE-part adapted for being located at or behind an ear (pinna) of the user (see e.g. FIG. 1A, 1B). At least some (e.g. two or more) of the M microphones of the microphone system may be arranged in the BTE-part. The hearing aid may comprise an ITE part adapted for being located at or in an ear canal of the user. The ITE-part may comprise at least some (e.g. one or more) of the M microphones of the microphone system.

The processor may be configured to determine the personalized ATF-vectors $ATF^*_{\theta^*,\varphi^*,p}$, for the user based on a) (the dictionary $\Delta_p$, of) the database Θ, b) the electric input signals $x_m(n)$, m=1, . . . , M, and c) the model of the acoustic propagation channel with a predefined or adaptively adjusted frequency. The personalized ATF-vectors may e.g. be determined continuously, e.g. every time frame l. The personalized ATF-vectors may e.g. be determined when triggered by a trigger indicating 'a new acoustic situation' (in dependence of a change in sound level or spectral content, e.g. above certain threshold measures). The personalized ATF-vectors may e.g. be determined in dependence of the activation of a specific hearing aid program or mode of operation (e.g. a power-up of the hearing aid system).

The frequency dependent acoustic transfer functions ATF may comprise absolute acoustic transfer functions AATF. To determine the absolute acoustic transfer functions, AATF-vectors $H_\theta$, of the dictionary $\Delta_p$, let $x_1(n), \ldots, x_M(n)$ denote the (preferably clean) test signals picked up by the microphones of the hearing aid (e.g. recorded in an acoustic laboratory, e.g. in an anechoic room). An (absolute) acoustic transfer function AATF (sometimes termed head related transfer function, HRTF) $H_m(\theta, k)$ from a given direction or location (θ) to the $m^{th}$ microphone, may be estimated using procedures known in the art. It may e.g. be beneficial that the test sound signal is a chirp signal (a tonal signal whose frequency increases with time); in this case, the AATF may be estimated using the procedure outlined in [Farina, 2000]. The hearing aid(s) may e.g. be assumed to be mounted as intended (intended orientation of the microphones) on the head of a given artificial or natural person.

The frequency dependent acoustic transfer functions ATF may comprise relative acoustic transfer functions RATF. To determine the relative acoustic transfer functions (RATF), e.g. RATF-vectors $d_\theta$, of the dictionary $\Delta_p$, from the corresponding absolute acoustic transfer functions, $H_\theta$, the element of RATF-vector ($d_\theta$) for the $m^{th}$ microphone and direction (θ) is $d_m(k, \theta) = H_m(\theta, k)/H_i(\theta, k)$, where $H_i(\theta, k)$ is the (absolute) acoustic transfer function from the given direction or location (θ) to a reference microphone (m=i) among the M microphones of the microphone system. Such absolute and relative transfer functions (for a given artificial or natural person) can be estimated (e.g. in advance of the use of the hearing aid system) and stored in the database Θ (or in a (sub-)dictionary $\Delta_p$ (for a specific artificial or natural person) of the database Θ). The resulting (absolute) acoustic transfer function (AATF) vector $H_\theta$ for sound from a given direction or location (θ) is denoted as $$H(\theta,k) = [H_1(\theta,k) \ldots H_M(\theta,k)]^T, k=1, \ldots, K$$

and the relative acoustic transfer function (RATF) vector do from this direction or location is denoted as $$d(\theta,k) = [d_1(\theta,k) \ldots d_M(\theta,k)]^T, k=1, \ldots, K$$

Absolute and/or relative transfer functions at different frequencies for different directions/locations of the sound source, for different artificial and/or natural persons (p), for different hearing aid styles (microphone system configurations), for different hearing aid orientations, etc. may be measured in advance of use of the hearing aid in question, and stored in relevant (person-specific) dictionaries ($\Delta_p$) of the database Θ.

The database Θ may comprise a number of different dictionaries $\Delta_p$, e.g. corresponding to different (artificial or natural) persons (e.g. having different acoustic propagation properties, e.g. caused or influenced by different heads (or head characteristics)). The number of different dictionaries may be 1, or any number larger than 1. The relevant number of different dictionaries for a given application may be determined as a compromise between accuracy of the personalized relative transfer functions and computational complexity. To limit the computational complexity, it is of interest to keep the number of different dictionaries below a maximum value, e.g. below 100, such as below 10.

The different hearing aid-orientations (go) on the user's head may relate to a microphone axis through at least two of the multitude of microphones, cf. e.g. FIG. 1A, 1B. The different hearing aid-orientations (go) may e.g. be described by a tilt angle (go) with a horizontal reference direction (e.g. a tilt angle in the horizontal plane (FIG. 1B), or out of (FIG. 1A) the horizontal plane). The different hearing aid-orientations (go) may e.g. be described by any tilt angle in space with a given reference direction, but of course some tilt angles are more probable than others (due to the physiognomy of the ear).

The hearing aid may be adapted to provide that a reference microphone axis through at least two of the multitude of microphones located in a horizontal plane and pointing in a forward direction of the user may be defined, when the hearing aid is correctly (as intended) mounted at or in the user's ear. The reference direction may e.g. be defined as a direction of the user's nose when looking straight ahead, cf. e.g. LOOK-DIR, or REF-DIR$_L$, REF-DIR$_R$ in FIG. 1C). Different hearing aid orientations ($\varphi$) on the user's head may e.g. relate to an angle $\varphi$. The elements of the hearing aid-orientation specific AATF vectors $H_{\theta,\varphi}$ or RATF vectors $d_{\theta,\varphi}$ may be absolute or relative transfer functions $H_m(\theta, \varphi, k)$ or $d_m(\theta, \varphi, k)$, respectively, representing direction- or location-dependent ($\theta$), and hearing aid-orientation dependent ($\varphi$), and frequency dependent (k) acoustic transfer functions from a target signal source to each of the M microphones (m=1, . . . , M) or representing acoustic transfer functions relative to the reference microphone (m=i) among the M microphones, respectively. For each microphone (m) of the hearing aid, the database $\Theta$ may comprise absolute or relative transfer functions ($H_m(\theta, \varphi, k)$ or $d_m(\theta, \varphi, k)$) for a multitude of different directions or locations ($\theta$) relative to the microphone system. For each direction or location ($\theta$) the database $\Theta$ may comprise absolute or relative transfer functions ($H_m(\theta, \varphi, k)$ or $d_m(\theta, \varphi, k)$) for a multitude of different hearing aid-orientations ($\varphi$) on the user's head. For each hearing aid-orientation ($\varphi$), the database $\Theta$ may comprise absolute or relative transfer functions ($H_m(\theta, \varphi, k)$ or $d_m(\theta, \varphi, k)$) for a multitude of different frequencies (k).

The database $\Theta$ may comprise a multitude P of dictionaries $\Delta_p$, p=1, . . . , P, comprising AATF-vectors $H_{\theta,\varphi,p}$ and/or RATF-vectors $d_{\theta,\varphi,p}$ for a corresponding multitude of different natural or artificial persons (p). The processor may be configured to determine the personalized (frequency dependent) AATF-vectors $H^*_{\theta,\varphi,p}$ or RATF-vectors $d^*_{\theta,\varphi,p}$ for the user based on the multitude P of dictionaries $\Delta_p$, p=1, . . . , P, of the database $\Theta$, the electric input signals $x_m(n)$, m=1, . . . , M, and the model of the acoustic propagation channels. The different persons (p) may exhibit different heads. The elements of the person specific AATF vectors $H_{\theta,\varphi,p}$ or RATF vectors $d_{\theta,\varphi,p}$ are absolute or relative transfer functions $H_m(\theta, \varphi, p, k)$, and $d_m(\theta, \varphi, p, k)$, respectively, representing direction- or location-dependent ($\theta$), person dependent (p, p=1, . . . , P), hearing aid-orientation dependent ($\varphi$), and frequency dependent (k) absolute acoustic transfer functions $H_m(\theta, \varphi, p, k)$ from said target signal source to each of said M microphones (m=1, . . . , M) and relative acoustic transfer functions relative $d_m(\theta, \varphi, p, k)$ with respect to a reference microphone (m=i) among said M microphones, respectively. The number of different persons P may e.g. be larger than 2, such as larger than 5, such as larger than 10, e.g. in the range between 2 and 100.

The multitude of dictionaries $\Delta_p$, p=1, . . . , P, may be associated with a corresponding multitude of different natural or artificial persons (p) having different heads, e.g. heads of different size, or different form, or different characteristic features, e.g. hair, nose, ear size or position on the head, etc. The multitude of dictionaries $\Delta_p$, p=1, . . . , P, may be associated with different artificial or natural persons for which specific AATF or RATF-vectors ($H_{\theta,\varphi,p}$, $d_{\theta,\varphi,p}$) have been generated, e.g. measured.

The personalized AATF or RATF-vector ($H^*_\theta$, $d^*_\theta$) for said user may be determined for different frequency indices (k) using the same AATF or RATF-vectors $H_{\theta,\varphi}$, $d_{\theta,\varphi}$ or $H_{\theta,p}$, $d_{\theta,p}$ or $H_{\theta,p,\varphi}$, $d_{\theta,p,\varphi}$ for some or all frequency indices (k) to estimate a given personalized AATF or RATF-vector ($H^*_\theta$, $d^*_\theta$). The processor may be configured to determine the personalized AATF or RATF-vector ($H^*_\theta$ or $d^*_\theta$), respectively, for the user from the individual AATF or RATF-vectors $H_{\theta,\varphi}$, $d_{\theta,\varphi}$ or $H_{\theta,p}$, $d_{\theta,p}$ or $H_{\theta,p,\varphi}$, $d_{\theta,p,\varphi}$ of the database $\Theta$ jointly across some of or all frequency bands k. In other words: The personalized AATF or RATF-vector ($H^*_\theta$, $d^*_\theta$) for the user is found by choosing the (same) candidate AATF or RATF vector for some or all frequency bands (not using one element, e.g. $H_m(\theta, \varphi', k')$ or $d_m(\theta, \varphi', k')$ for one value of frequency index k (k') and another element $H_m(\theta, \varphi'', k'')$ or $d_m(\theta, \varphi'', k'')$ for another value of k (k'')).

The personalized AATF or RATF-vector $H^*_\theta$ or $d^*_\theta$, respectively, for the user may be determined by a statistical method or a learning algorithm. The personalized AATF or RATF-vector $H^*_\theta$ or $d^*_\theta$ for the user may be determined by a number of different methods available in the art, e.g. maximum likelihood estimate (MLE) methods, cf. e.g. EP3413589A1. Other methods may include statistical methods, e.g. Mean Squared Error (MSE), regression analysis (e.g. Least Squares (LS)), e.g. probabilistic methods (e.g. MLE), e.g. supervised learning (e.g. a neural network algorithm).

The personalized AATF or RATF-vector $H^*_\theta$ or $d^*_\theta$ for the user may be determined by minimizing a cost function. The personalized ATF-vector ATF* for the user may be associated with values of the specific person p=p*, the specific direction/location $\theta_j=\theta^*$ to/of the sound source, and the specific hearing aid-orientation $\varphi^*$ that best match the optimization criterion (e.g. a cost function). The hearing aid may e.g. be configured to log one or more of said personalized parameters (e.g. the person p*), e.g. in a learning mode of operation, cf. e.g. FIG. 5A. This may be used to get an indication of the head characteristics of the user (if the person p* corresponds to the same p-value when logged over time). The personalized parameters z*(z=p, $\theta$, $\varphi$) may e.g. be stored together with a parameter indicating a quality (e.g. a signal to noise ratio (SNR), or an estimated noise level, or a signal level, etc.) of the electric input signals that were used to determine the parameter value(s) in question. Thereby the logged personalized parameter values may be qualified. The logged values that are associated with a quality parameter below a threshold value may be discarded before their possible use, e.g. in the hearing aid. The hearing aid may be configured to only log personalized parameter values if the associated quality of the electric input signals is above a certain threshold value.

In case the logged (possibly qualified by a signal quality parameter) personalized parameter p* is consistently equal to a specific value $p_u$ of p, the dictionary $\Delta_{pu}$ of ATF-vectors associated with that person ($p_u$) may be used by the hearing aid instead of the proposed estimation scheme based on the dataset comprising a number of dictionaries for different persons. Such transition may be performed in a fitting session, e.g. after a certain period of logging, e.g. a month or several months (e.g. 3 months), or after a learning mode of operation of the hearing aid system, cf. below. The hearing aid may be configured to perform the transition itself in dependence of the logged data and a transition criterion.

The hearing aid system may be configured to log the estimated personalized ATF-vectors ATF* over time and thereby building a database of personalized acoustic transfer functions for different directions/locations. The hearing aid may e.g. be configured to only log personalized ATF-vectors ATF* that are associated with a quality (e.g. an estimated SNR) of the electric input signals is above a certain threshold value.

For each given values of the electric input signals, the processor may be configured to try out (e.g. evaluate) the same dictionary $\Delta_p$ of AATF or RATF-vectors $H_{\theta,\varphi,p}$ or $d_{\theta,\varphi,p}$ for a given person (p) for all values of the frequency index k, k=1, . . . , K. For given electric input signals, the processor may be configured to try out (e.g. evaluate) each of the dictionaries $\Delta_p$ of AATF or RATF-vectors $H_{\theta,\varphi,p}$, $d_{\theta,\varphi,p}$ for different persons p, p=1, . . . , P, that correspond to the candidate direction to or location ($\theta$) for the multitude of different hearing aid-orientations $\varphi_q$, q=1, . . . , Q, on the head of said person (p) for all values of the frequency index k, k=1, . . . , K.

The processor may be configured to select the AATF or RATF vector $H_{\theta,\varphi,p}$, $d_{\theta,\varphi,p}$ corresponding to a specific hearing aid orientation ($\varphi$) that is optimal as the personalized AATF or RATF-vector $H^*_\theta$ or $d^*_\theta$, respectively, for said user in the given acoustic situation. 'Optimal' may be with respect to a cost function, e.g. the RFTF-vector that minimizes the cost function, e.g. optimal in a maximum likelihood sense. The processor may be configured to select the AATF or RATF vector $H_{\theta,\varphi,p}$, $d_{\theta,\varphi,p}$ corresponding to a specific direction or location and a specific hearing aid orientation that is optimal as the personalized AATF or RATF-vector $H^*_\theta$ or $d^*_\theta$, respectively, for the user. Thereby a specific direction to or location of the target sound source AND/OR a specific hearing aid orientation may be estimated.

The processor may be configured to select the AATF or RATF vector $H_{\theta,\varphi,p}$, $d_{\theta,\varphi,p}$ corresponding to a specific person (p) and a specific hearing aid orientation ($\varphi$) that is optimal as the personalized AATF or RATF-vector $H^*_\theta$ or $d^*_\theta$, respectively, for said user in the given acoustic situation. The processor may be configured to select the AATF or RATF vector $H_{\theta,\varphi,p}$, $d_{\theta,\varphi,p}$ corresponding to a specific person (p*) and a specific hearing aid orientation ($\varphi$*) that is optimal as the personalized AATF or RATF-vector $H^*_\theta$ $d^*_\theta$ for said user. 'Optimal' may be with respect to a cost function, e.g. the AATF or RFTF-vector that minimizes the cost function, e.g. optimal in a maximum likelihood sense. Thereby a specific direction to or location of the target sound source AND/OR a specific 'person' (e.g. a specific head size and/or other body related characteristics) AND/OR a specific hearing aid orientation may be estimated.

The hearing aid may comprise the database Θ. The hearing aid may comprise memory wherein said database Θ is stored. The memory may be connected to the processor. The processor may form part of the hearing aid. The hearing aid may comprise the database as well as the processor. The hearing aid system may be constituted by the hearing aid. The hearing aid may be configured—at least in a specific mode of operation (e.g. in a learning mode of operation) or in a specific hearing aid program—to use the database to determine personalized absolute or relative acoustic transfer functions in a given acoustic situation (reflected by specific electric input signals from the M microphones of the microphone system).

The hearing aid may comprise a signal processor for processing the electric input signals and providing a processed output signal in dependence of one or more processing algorithms, e.g. a beamforming algorithm, a noise reduction algorithm, a compression algorithm, etc.

The hearing aid may comprise an output transducer connected to the signal processor for presenting the processed signal as stimuli perceivable by the user as sound from the environment (at least in a normal mode of operation).

The hearing aid may comprise a beamformer filter configured to provide a spatially filtered signal based on said electric input signals and beamformer weights, wherein the beamformer weights are determined using said personalized AATF or RATF-vector $H^*_\theta$ $d^*_\theta$ for said user. The filter weights may be adaptively updated. The hearing aid may be configured to apply the personalized absolute or relative acoustic transfer functions in the beamformer filter to determine (e.g. adaptively update) said beamformer weights. Filter weights of an MVDR beamformer may e.g. be determined (such as adaptively determined) as discussed in EP3253075A1.

The database Θ may be stored on a device or a system accessible to the hearing aid, e.g. via communication link. The database Θ may be stored in a memory of an auxiliary device connectable to the hearing aid via a communication link. The processor may form part of the auxiliary device. The database Θ may be stored on a server accessible to the hearing aid, e.g. via communication network, e.g. the Internet.

The hearing aid may be constituted by or comprising an air-conduction type hearing aid, a bone-conduction type hearing aid, a cochlear implant type hearing aid, or a combination thereof.

The hearing aid system may comprise an auxiliary device wherein the database Θ is stored. The hearing aid and the auxiliary device may comprise antenna and transceiver circuitry allowing data to be exchanged between them. The database Θ may be stored in a memory of the auxiliary device connectable to the hearing aid via a communication link. The processor may form part of the auxiliary device. The auxiliary device may comprise a remote control device or APP for controlling functionality of the hearing aid system. The auxiliary device may be constituted by or comprise a smartphone or another portable electronic device with communication (and processing) capability.

The hearing aid system may be configured to comprise a learning mode of operation of a certain (e.g. configurable) duration, wherein an optimal person (p*) selected from the database Θ is determined based on a specific, e.g. exhaustive, search involving a multitude (such as all) of the AATF or RATF-vectors $H_{\theta,\varphi,p}$ or $d_{\theta,\varphi,p}$ of a multitude, such as all, of the directories $\Delta_p$ for the persons (p=1, 2, . . . , P) represented in the database Θ (e.g. for selected or all locations ($\theta_j$), orientations ($\varphi_q$), and values of the frequency index k, k=1, . . . , K). Selected locations or orientations or frequencies may be provided based on prior knowledge (e.g. to focus on realistic values for the current situation). When the learning mode is terminated, a normal mode of operation may be entered, wherein the most commonly determined optimal person during the learning mode is selected as the best representation (p**, cf. e.g. FIG. 5A) of the current user of the hearing aid system. Thereby computing power can be saved in the normal mode of operation. This is based on the assumption that the sound propagation/reflection properties of the (e.g. head of the) user does not change (much) over time. Some changes may, however, be introduced by different hair styles or clothing, etc., but this may be taken into account by initiating a learning mode at each power-up of the hearing aid system.

A (possibly short) learning mode of operation may be entered during or after each power-up of the hearing aid system (or on request, e.g. from a user interface). A short learning mode of operation may e.g. have a duration of the order of minutes, e.g. less than thirty, or less than ten, or less than five minutes. During the short learning mode, the best representation of the current user, in terms of candidate head-and-torso characteristics, of the hearing aid system may be estimated and e.g. held fixed in a subsequent normal mode of operation of the hearing aid system, cf. FIG. 5A. Likewise, during the short learning mode, the best representation of the orientation of the hearing aid(s) on the head of the current user of the hearing aid system may be estimated and e.g. held fixed in a subsequent normal mode of operation of the hearing aid system, cf. FIG. 5B.

Further, the orientation ($\varphi_q$) (e.g. tilt angle) of the hearing aid on the user's head may be assumed not to change fast over time. Any (large) deviation from normal or intended may be assumed to be introduced during mounting of the hearing aids in connection with power-up of the device. Hence, as indicated for the detection of the optimal person (p**), an optimal orientation ($\varphi_q$*) may be consecutively determined (for different electric input signals) for a given hearing aid in the learning mode (e.g. after a power-up) and kept fixed in a subsequent normal mode of operation. The optimal orientation ($\varphi_q$*) may e.g. be determined after the optimal person (p) has been determined based on a specific, e.g. exhaustive, search involving a multitude (such as all) of the AATF or RATF-vectors $H_{\theta,\varphi_q,p^{}}$ or $d_{\theta,\varphi_q,p^{}}$ of the directory $\Delta_{p^{}}$ for the optimal person (p=p) in the database $\Theta$ (e.g. for selected or all locations ($\theta_j$), orientations ($\varphi_q$), and values of the frequency index k, k=1, . . . , K). Again, when the learning mode is terminated, a normal mode of operation may be entered, wherein the most commonly determined optimal person (p) during the learning mode is selected as the best representation (p, cf. e.g. FIG. 5A) of the current user of the hearing aid system, and the most commonly determined orientation (($\varphi_{q^{}}$) during the learning mode is selected as the best representation (($\varphi_{q^{**}}$, cf. e.g. FIG. 5B) of the current orientation of the hearing aid at the ear where the hearing aid is mounted.

In case of a binaural hearing aid system, the left and right hearing aids may be assumed to be associated with the same person (head), e.g. by exchanging information between the two hearing aids of the binaural hearing aid system. In case of a binaural hearing aid system, the left and right hearing aids may be assumed to be associated with different orientations of the hearing aid (e.g. determined independently by the left and right hearing aids of the binaural hearing aid system).

In a normal mode of operation, after a learning mode of operation, at least the most optimal person (p), in terms of head-and-torso characteristics, may have been determined and optionally also the most optimal orientation (($\varphi_{q^{}}$) of the hearing aid (or the hearing aids at the left and right ears of the user). In such case, the remaining calculations to determine appropriate acoustic transfer functions for given electric input signals is hugely diminished (to only include the different location or direction of arrival ($\theta_j$) of the target sound). In case of a binaural hearing aid system, the left and right hearing aids may be assumed to be associated with the same location or direction of arrival ($\theta_j$) of the target sound at the left and right hearing aids (or at least a known relation between the two angles of the left and right hearing aids as defined by the specific location of the target source relative to the center of the head and the distance between the left and right hearing aids, cf. e.g. EP2928214A1, e.g. FIG. 3D).

When the optimal person (p**) has been determined in a learning mode of operation, it may be assumed constant (e.g. until a, e.g. user-initiated, 'recalibration' is performed), and only the orientation of the hearing aid is determined in a learning mode after a power-up of the hearing aid (system).

A short learning mode of operation (e.g. of 5-10 minutes' duration) may e.g. be repeated with a certain frequency, e.g. every hour or evert three hours, to check the validity of the determined (optimized) person (e.g. head) and/or orientation (e.g. tilt angle) of the hearing aid(s). The learning mode operation may also be repeated if sensor—e.g., accelerometers on board the hearing aid—suggest that the hearing aids have been remounted.

A 'normal mode of operation' may in the present context be taken to mean other modes of operation than the 'learning mode'.

It is the intention that the features of the hearing aid described below can be combined with the first hearing aid system in various embodiments.

A Second Hearing Aid System:

In a further aspect, a second hearing aid system comprising a hearing aid configured to be worn on the head at or in an ear of a user is provided. The hearing aid may comprise a microphone system comprising a multitude of M of microphones arranged in said hearing aid, where M is larger than or equal to two, the microphone system being adapted for picking up sound from the environment and to provide M corresponding electric input signals $x_m(n)$, m=1, . . . , M, n representing time, the environment sound at a given microphone comprising a mixture of a target sound signal $s_m(n)$ propagated via an acoustic propagation channel from a direction to or a location ($\theta$) of a target sound source to the $m^{th}$ microphone of the hearing aid when worn by the user, and possible additive noise signals $v_m(n)$ as present at the location of the $m^{th}$ microphone, wherein the acoustic propagation channel is modeled as $x_m(n)=s_m(n)h_m(\theta)+v_m(n)$, and wherein $h_m(\theta)$ is an acoustic impulse response for sound for that acoustic propagation channel.

The hearing aid system may comprise a processor connected to said number of microphones, and a database $\Theta$ comprising a dictionary $\Delta_p$ of vectors, termed ATF-vectors, whose elements $ATF_m(\theta,p,k)$, m=1, . . . , M, are frequency dependent acoustic transfer functions representing direction- or location-dependent ($\theta$), and frequency dependent (k) propagation of sound from a location ($\theta$) of a target sound source to each of said M microphones, k being a frequency index, k=1, . . . , K, where K is a number of frequency bands, when said microphone system is mounted on a head at or in an ear of a natural or artificial person (p), and wherein said dictionary $\Delta_p$ comprises ATF-vectors ATF for said person (p) for a multitude of different directions or locations $\theta_j$, j=1, . . . , J relative to the microphone system.

The database $\Theta$ may comprise a multitude P of dictionaries $\Delta_p$, p=1, . . . , P, where p is a person index, said dictionaries comprising ATF-vectors ATF for a corresponding multitude of different natural or artificial persons (p), and the processor may be configured to, at least in a learning mode of operation, determine personalized ATF-vectors ATF* for said user based on said multitude of dictionaries $\Delta_p$ of said database $\Theta$, said electric input signals $x_m(n)$, m=1, . . . , M, and said model of the acoustic propagation channels.

The multitude of dictionaries $\Delta_p$ may each comprise hearing aid-orientation specific ATF vectors $ATF_{\theta,\varphi_q,p}$ for a multitude of different hearing aid-orientations $\varphi_q$, q=1, . . .

, Q, on the head of said person (p), for said multitude of different directions or locations $\theta_j$, j=1, . . . , J, each ATF vector ($ATF_{\theta,\varphi,p}$) being frequency dependent (k=1, . . . , K), e.g. as illustrated in FIG. 2A (p=1), 2B (p=P).

It is the intention that the features of the first hearing aid system and the features of the hearing aid can be combined with the second hearing aid system.

A Hearing Aid:

The (first and second) hearing aid system may comprise or be constituted by a hearing aid.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid).

The hearing aid may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing aid may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise antenna and transceiver circuitry (e.g. a wireless receiver) for wirelessly receiving a direct electric input signal from another device, e.g. from an entertainment device (e.g. a TV-set), a communication device, a wireless microphone, or another hearing aid. The direct electric input signal may represent or comprise an audio signal and/or a control signal and/or an information signal. The hearing aid may comprise demodulation circuitry for demodulating the received direct electric input to provide the direct electric input signal representing an audio signal and/or a control signal e.g. for setting an operational parameter (e.g. volume) and/or a processing parameter of the hearing aid. In general, a wireless link established by antenna and transceiver circuitry of the hearing aid can be of any type. The wireless link may be established between two devices, e.g. between an entertainment device (e.g. a TV) and the hearing aid, or between two hearing aids, e.g. via a third, intermediate device (e.g. a processing device, such as a remote control device, a smartphone, etc.). The wireless link may be used under power constraints, e.g. in that the hearing aid may be constituted by or comprise a portable (typically battery driven) device. The wireless link may be a link based on near-field communication, e.g. an inductive link based on an inductive coupling between antenna coils of transmitter and receiver parts. The wireless link may be based on far-field, electromagnetic radiation. The communication via the wireless link may be arranged according to a specific modulation scheme, e.g. an analogue modulation scheme, such as FM (frequency modulation) or AM (amplitude modulation) or PM (phase modulation), or a digital modulation scheme, such as ASK (amplitude shift keying), e.g. On-Off keying, FSK (frequency shift keying), PSK (phase shift keying), e.g. MSK (minimum shift keying), or QAM (quadrature amplitude modulation), etc.

The communication between the hearing aid and the other device may be in the base band (audio frequency range, e.g. between 0 and 20 kHz). Preferably, communication between the hearing aid and the other device is based on some sort of modulation at frequencies above 100 kHz. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology).

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, e.g. less than 20 g.

The hearing aid may comprise a forward or signal path between an input unit (e.g. an input transducer, such as a microphone or a microphone system and/or direct electric input (e.g. a wireless receiver)) and an output unit, e.g. an output transducer. The signal processor may be located in the forward path. The signal processor may be adapted to provide a frequency dependent gain according to a user's particular needs. The hearing aid may comprise an analysis path comprising functional components for analyzing the input signal (e.g. determining a level, a modulation, a type of signal, an acoustic feedback estimate, etc.). Some or all signal processing of the analysis path and/or the signal path may be conducted in the frequency domain. Some or all signal processing of the analysis path and/or the signal path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 µs, for $f_s=20$ kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry comprise(s) a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit for converting a time variant input signal to a (time variant) signal in the (time-) frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing aid is reduced (e.g. to save power), e.g. to disable wireless communication, and/or to disable specific features of the hearing aid.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain) One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);

b) the current acoustic situation (input level, feedback, etc.), and c) the current mode or state of the user (movement, temperature, cognitive load, etc.);

d) the current mode or state of the hearing aid (program selected, time elapsed since last user interaction, etc.) and/or of another device in communication with the hearing aid.

The classification unit may be based on or comprise a neural network, e.g. a rained neural network.

The hearing aid may comprise an acoustic (and/or mechanical) feedback control (e.g. suppression) or echo-cancelling system.

The hearing aid may further comprise other relevant functionality for the application in question, e.g. compression, noise reduction, etc.

The hearing aid may comprise a hearing instrument, e.g. a hearing instrument adapted for being located at the ear or fully or partially in the ear canal of a user, e.g. a headset, an earphone, an ear protection device or a combination thereof. The hearing assistance system may comprise a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing aid system or a hearing aid as described above, in the 'detailed description of embodiments' and in the claims, is moreover provided. Use may be provided in a system comprising audio distribution. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Binaural Hearing Aid System:

In a further aspect, a binaural hearing aid system comprising first and second hearing aids as described above, in the detailed description of embodiments and in the claims is provided. The first and second hearing aids may each comprises transceiver circuitry configured to allow data to be exchanged between them, e.g. via an intermediate device (e.g. the auxiliary device) or system.

The binaural hearing aid system may comprise an auxiliary device.

The binaural hearing aid system may be adapted to establish a communication link between the first and second hearing aids and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the hearing aid system via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system.

Embodiments of the disclosure may e.g. be useful in hearing aid applications such as beamforming, own voice estimation, own voice detection, keyword detection, etc.

A Method of Operating a Hearing Aid or a Hearing Aid System:

A method of operating a hearing aid system comprising a hearing aid configured to be worn on the head at or in an ear of a user is provided. The method comprises providing by a multitude of microphones a corresponding multitude of electric input signals $x_m(n)$, m=1, . . . , M, n representing time, comprising environment sound from the environment of the user, wherein the environment sound of a given one of said multitude of electric input signals comprises a mixture of a target sound signal $s_m(n)$ propagated via an acoustic propagation channel from a direction to or a location ($\theta$) of a target sound source to the $m^{th}$ microphone of the hearing aid when worn by the user, and possible additive noise signals $v_m(n)$ as present at the location of the $m^{th}$ microphone, wherein the acoustic propagation channel is modeled as $x_m(n)=s_m(n)h_m(\theta)+v_m(n)$, and wherein $h_m(\theta)$ is an acoustic impulse response for sound for that acoustic propagation channel.

The method may further comprise providing, or providing access to, a database $\Theta$ comprising a dictionary $\Delta_p$ of vectors, termed ATF-vectors, whose elements $ATF_m(\theta,p,k)$, m=1, . . . , M, are frequency dependent acoustic transfer functions representing direction- or location-dependent ($\theta$), and frequency dependent (k) propagation of sound from a location ($\theta$) of a target sound source to each of said M microphones, k being a frequency index, k=1, . . . , K, where K is a number of frequency bands, when said microphone system is mounted on a head at or in an ear of a natural or artificial person (p), and wherein said dictionary $\Delta_p$ comprises ATF-vectors ATF for said person (p) for a multitude of different directions or locations $\theta_j$, j=1, . . . , J relative to the microphone system.

The method may further comprise providing that the database $\Theta$ comprises a multitude P of dictionaries $\Delta_p$, p=1, . . . , P, where p is a person index, said dictionaries comprising ATF-vectors ATF for a corresponding multitude of different natural or artificial persons (p), and processing, at least in a learning mode of operation, said multitude of dictionaries $\Delta_p$ of said database $\Theta$, said electric input signals $x_m(n)$, m=1, . . . , M, and said model of the acoustic propagation channels to thereby determine personalized ATF-vectors ATF* for said user.

It is intended that some or all of the structural features of the device or system described above, in the 'detailed description of embodiments' or in the claims may be combined with embodiments of the method, when appropriately substituted by a corresponding process and vice versa.

Embodiments of the method may have the same advantages as the corresponding device or system.

The method may further comprise providing that each of said dictionaries $\Delta_p$, p=1, . . . , P, of said database $\Theta$ are hearing aid-orientation specific and comprises ATF vectors (ATF$_{\theta,p,\varphi}$) for a multitude of different hearing aid-orientations $\varphi_q$, q=1, . . . , Q, on the head of the given person (p), for said multitude of different directions or locations $\theta_j$, j=1, . . . , J; and processing, at least in a learning mode of operation, said multitude of dictionaries $\Delta_p$ of said database $\Theta$, said electric input signals $x_m(n)$, m=1, . . . , M, and said model of the acoustic propagation channels to thereby determine personalized ATF-vectors ATF* for said user.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

Figure 1A:
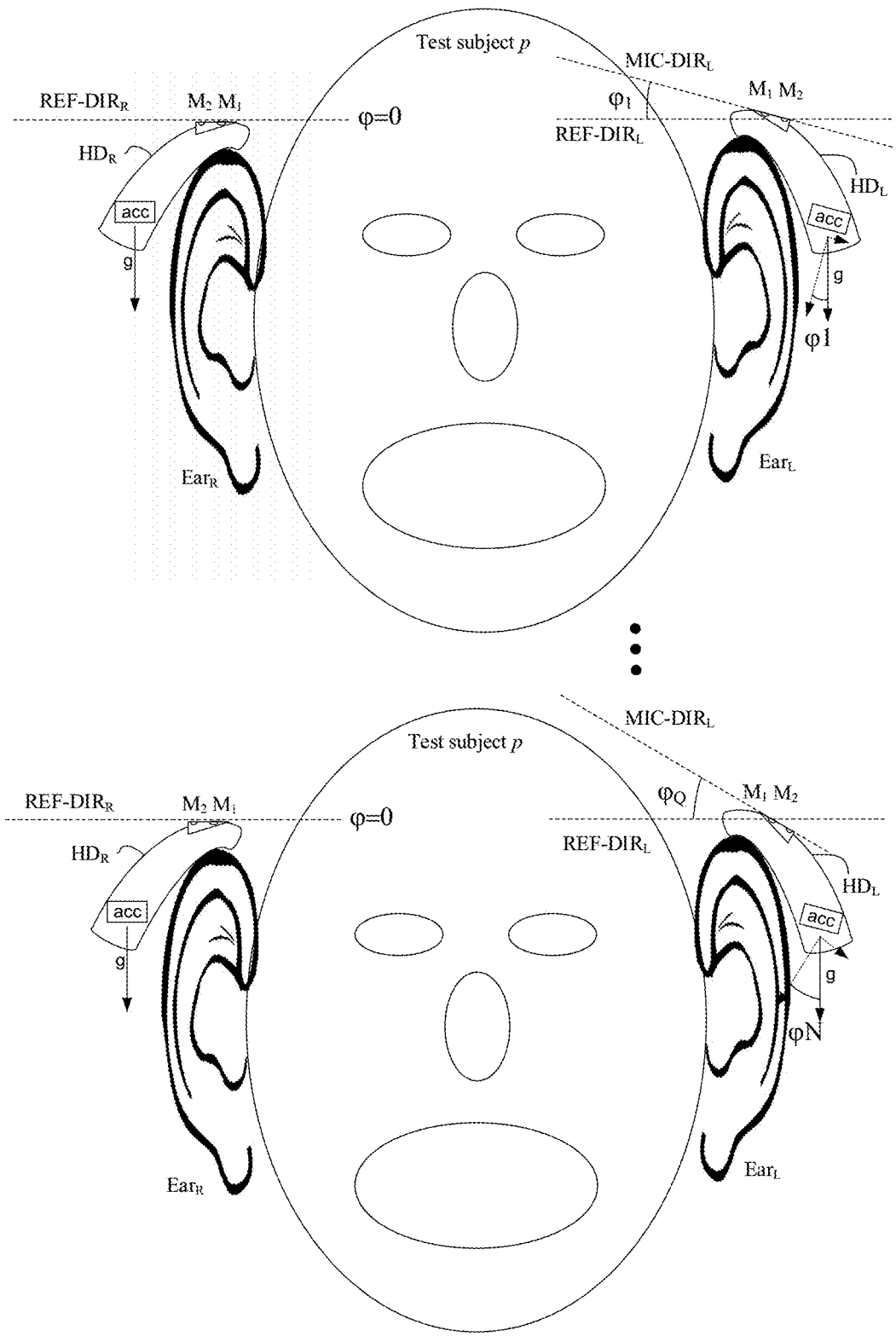
FIG. 1A schematically illustrates a multitude Q of examples of a head of a person (p) wearing a hearing aid system comprising left and right hearing aids, wherein the right hearing aid is mounted as intended (with a microphone axis parallel to a horizontal reference direction $\varphi=0$) and where in the top drawing the left hearing aid is mounted with its microphone direction tilted out of the horizontal plane with a first relatively small tilt angle ($\varphi=\varphi_1$) compared to the reference direction ($\varphi=0$), and in the bottom drawing the left hearing aid is mounted with its microphone direction tilted out of the horizontal plane with a different, $Q^{th}$, relatively large tilt angle ($\varphi=\varphi_Q$) compared to the reference direction ($\varphi=0$), FIG. 1B schematically illustrates a multitude Q of examples of a head of a person (p) wearing a hearing aid system comprising left and right hearing aids, wherein the left hearing aid is mounted as intended (parallel to a horizontal reference direction $\varphi=0$) and in the top drawing the right hearing aid is mounted with its microphone direction tilted in the horizontal plane with a first relatively small tilt angle ($\varphi=\varphi_1$) compared to the reference direction ($\varphi=0$), and in the bottom drawing the right hearing aid is mounted with its microphone direction tilted in the horizontal plane with a different, $Q^{th}$, relatively large tilt angle ($\varphi=\varphi_Q$) compared to the reference direction ($\varphi=0$), FIG. 1C schematically illustrates a typical geometrical setup of a user wearing a binaural hearing aid system in an environment comprising a (point) source in a front half plane of the user, FIG. 1D schematically illustrates a head of a person (p) wearing a hearing aid system comprising left and right hearing aids, wherein the left and right hearing aid are mounted as intended (parallel to a horizontal reference direction $\varphi=0$), and where the test sound is positioned at a multitude J of directions (represented by angles $\theta_j$, j=1, . . . , J) in a horizontal plane relative to the centre of the persons head, and FIG. 1E schematically illustrates a multitude P of examples of heads of a person (p=1, . . . , P) wearing a hearing aid system comprising left and right hearing aids, wherein the heads of the different persons have different characteristics, here head size $a_p$, FIG. 2A schematically illustrates for a given $1^{st}$ test person (p=1), a combination of measurements of acoustic transfer functions ATF for different locations ($\theta_j$, j=1, . . . , J), and for each location for different hearing aid-orientations ($\varphi_q$, q=1, . . . , Q), and for each hearing aid orientation for each frequency index (k, k=1, . . . , K), and FIG. 2B schematically illustrates the same as FIG. 2A, but for the $P^{th}$ test person, each person (p, p=1, . . . , P) being assumed to have different acoustic characteristics of the head, e.g. different head sizes ($a_p$), FIG. 3 schematically shows an exemplary block diagram of a hearing aid according to the present disclosure.

The personalized parameters $z^*(z=p, \theta, \varphi)$ may e.g. be stored together with a parameter indicating a quality (e.g. a signal to noise ratio (SNR), or an estimated noise level, or a signal level, etc.) of the electric input signals that were used to determine the parameter value(s) in question. Thereby the logged personalized parameter values may be qualified.

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing aids, in particular to beamforming/noise reduction.

The present disclosure relates to a hearing aid (e.g. comprising a microphone array), or a binaural hearing aid system, configured to estimate personalized absolute or relative acoustic transfer functions for a user of the hearing aid (or hearing aid system).

The present disclosure is based on the assumption that a dictionary of absolute acoustic transfer function (AATFs) and/or relative transfer functions (RATFs), i.e., acoustic transfer functions from a target signal source to any microphones in the hearing aid system relative to a reference microphone, is available. Basically, the proposed scheme aims at finding the AATF or RATF in the dictionary which, with highest likelihood (or other optimization measure) (among the dictionary entries), was "used" in creating the currently observed (noisy) target signal.

This dictionary element may then be used for beamforming purposes (the absolute or relative acoustic transfer function is an element of most beamformers, e.g. an MVDR beamformer).

Additionally, since each AATF or RATF dictionary element has a corresponding direction or location attached to it, an estimate of the direction of arrival (DOA) is thereby provided. Likewise, since each AATF or RATF dictionary element may have a corresponding hearing aid-orientation associated with it, an estimate of the hearing aid-orientation (or its deviation from an intended orientation) is thereby provided. Likewise, since each AATF or RATF dictionary element may have a corresponding person (or characteristics of the head) associated with it, an estimate of characteristics of the head of the user can thereby be provided.

The database Θ may then—for individual microphones of the microphone system—comprise corresponding values of location of or direction to a sound source (e.g. indicated by horizontal angle θ), and absolute (AATF) or relative transfer functions RATF at different frequencies (AATF(k,θ) or RATF(k,θ), k representing frequency) from the sound source at that location to the microphone in question. The proposed scheme may calculate likelihoods (or other, e.g. cost-function based, measures) for a sub-set of, or all, absolute or relative transfer functions of the database (and thus locations/directions) and microphones and points to the location/direction having largest (e.g. maximum) likelihood (or other measure).

The microphone system may e.g. constitute or form part of a hearing device, e.g. a hearing aid, adapted to be located in and/or at an ear of a user. In an aspect, a hearing system comprising left and right hearing devices, each comprising a microphone system according to the present disclosure is provided. In an embodiment, the left and right hearing devices (e.g. hearing aids) are configured to be located in and/or at left and right ears, respectively, of a user.

The method chooses actual AATFs or RATFs from a dictionary of candidate AATFs or RATFs. Using a dictionary of candidate AATFs or RATFs ensures that the resulting AATF or RATF is physically plausible—it is a way of imposing the prior knowledge that the microphones of the hearing assistive device are located at a particular position on the head of the user. According to the present disclosure, the database is populated with AATFs or RATFs from several (potentially many) different heads, and/or AATFs or RATFs for hearing assistive devices in different position on the ear of the user.

The proposed idea comprises extended dictionaries, where the extension consists of
  a) Several AATFs or RATFs from the same person, but measured with different HA positions (e.g., tilts).
  b) AATFs or RATFs from the same angles/positions, but for several (potentially many) persons' (heads).
  c) Combination of a) and b).
  d) The extended dictionary may contain AATFs or RATFs for each ear individually, or the combined set of microphones for both ears (e.g. for binaural beamforming).

When trying out dictionary elements (in order to decide the AATFs or RATFs that are active (optimal) for the current situation), we may try out (e.g. evaluate) particular sub-sets of the extended dictionary, for example:
  a) For each candidate direction/position, try out (e.g. evaluate) the subset of AATF- or RATF-vectors for all frequencies that correspond to a particular HA-tilt (orientation). Select the subset of AATF or RATF vectors that is best, e.g. in maximum likelihood sense.
  b) For each candidate direction/position, try out (e.g. evaluate) the subset of AATF- or RATF-vectors for all frequencies that correspond to a particular head. Select the subset of AATF- or RATF vectors that is best, e.g. in maximum likelihood sense.
  c) Combination of a) and b).
  d) Subsets may describe binaural AATFs or RATFs (e.g. using M=3 or M=4 mics), or monaural AATFs or RATFs, typically using M=2 or M=3 dimensional AATF- or RATF vectors.

'Try out' may e.g. be taken to mean 'evaluate a likelihood' of a given candidate among a given subset of transfer functions and to pick out the candidate fulfilling a given optimization criterion (e.g. having a maximum likelihood, ML).

This procedure has the following advantages:
  1) Better performance in general, because we take into account consistent information about HA position (a)), or user head characteristics. For example: all AATF- or RATF-vectors correspond to a particular head.
  2) Significantly lower search complexity: we don't do an exhaustive search where all AATF- or RATF vector combinations (for all frequencies, HA orientations (e.g. tilts), persons (e.g. heads)) are tried out (e.g. evaluated) exhaustively. Instead, they are tried out (e.g. evaluated) in physically plausible subsets, i.e., only AATF- or RATF-vectors that "belong together" are tried out.
  3) The selected subset provides an estimate of underlying HA-positions or user head types/sizes. This information may be passed on to improve performance of other algorithms, e.g. for compensating for microphone positions, etc.

Figure 1B:
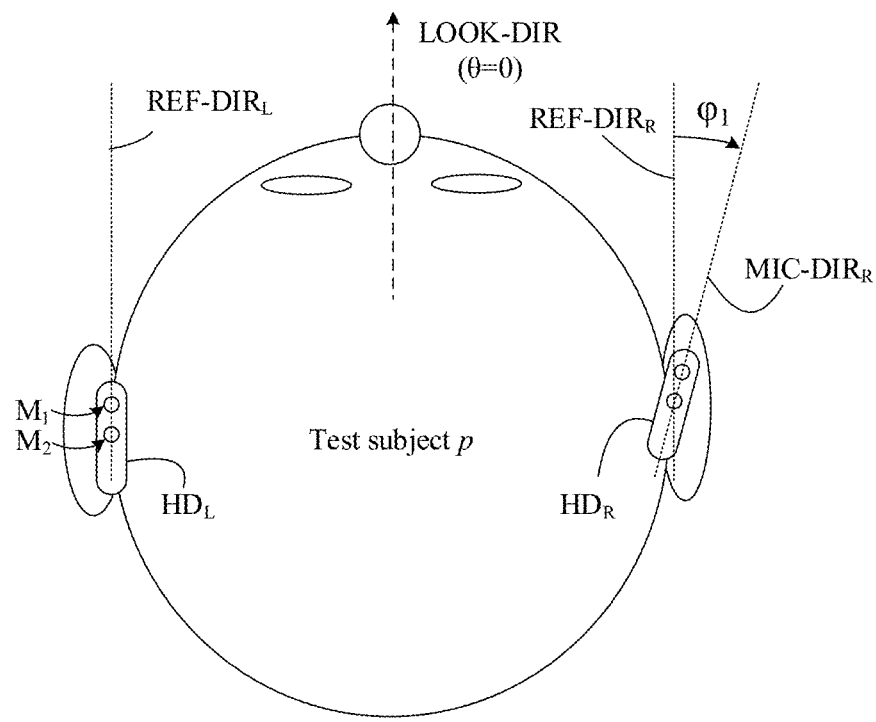
Figure 1B:
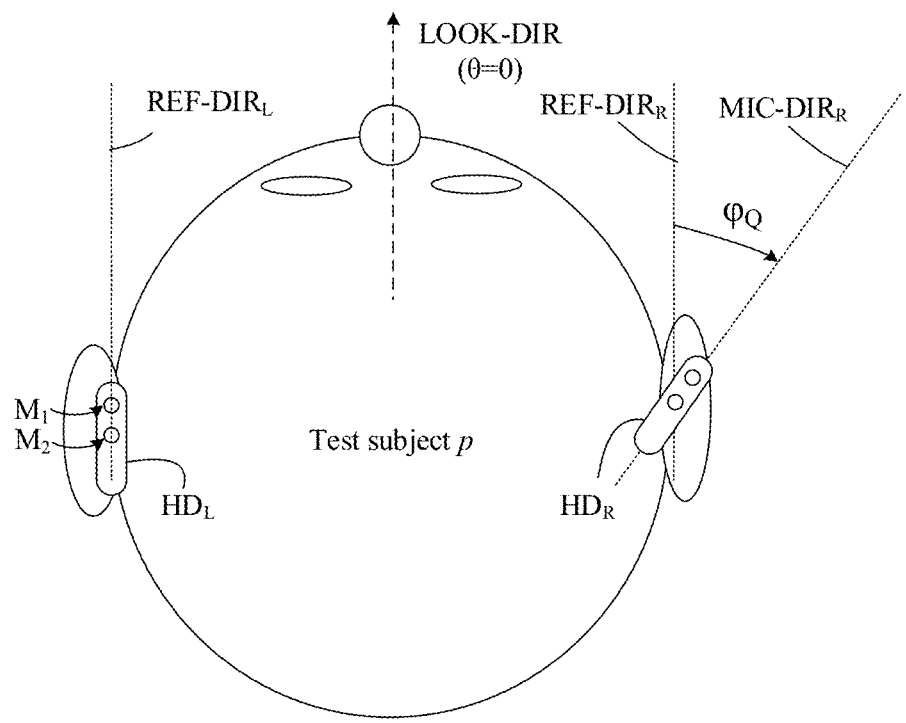

4) If applied independently to each ear (i.e., monaurally), we can detect if HA location/tilt is different across ears (see FIG. 1A, 1B). If applied jointly to both ears (i.e., in a binaural setup), performance in determining the correct AATF or RATF set is expected to increase because more measurements are used.

FIGS. 1A and 1B each illustrate a user (U) wearing a binaural hearing system comprising left and right hearing devices $HD_L$, $HD_R$, which are differently mounted at left and right ears of a user, in FIG. 1A one hearing device having its microphone axis pointing out of the horizontal plane ($\varphi \neq 0$), and in FIG. 1B one hearing device having its microphone axis not pointing in the look direction of the user ($\theta \neq 0$).

FIG. 1A shows a multitude Q of examples of a head of a person (e.g. a test subject p) wearing a hearing aid system comprising left and right hearing aids, wherein the right hearing aid ($HD_R$) is mounted as intended (with a microphone axis parallel to a horizontal reference direction $\varphi=0$ (REF-$DIR_R$)). In the top drawing, the left hearing aid (HDL) is mounted with its microphone direction (MIC-$DIR_L$) tilted out of the horizontal plane with a first relatively small tilt angle ($\varphi=\varphi_1$) compared to the reference direction ($\varphi=0$) (REF-$DIR_L$). In the bottom drawing, the left hearing aid ($HD_L$) is mounted with its microphone direction (MIC-$DIR_L$) tilted out of the horizontal plane with a different, $Q^{th}$, relatively large tilt angle ($\varphi=\varphi_Q$) compared to the reference direction ($\varphi=0$). It is indicated (by bold dots •••) that other tilt angles ($\varphi_q$) may be present between $\varphi_1$ and $\varphi_Q$ (i.e. symbolizing q=1, . . . , Q).

FIG. 1B schematically illustrates a multitude Q of examples of a head of a person (e.g. a test subject p) wearing a hearing aid system comprising left and right hearing aids ($HD_L$, $HD_R$), wherein the left hearing aid ($HD_L$) is mounted as intended (parallel to a horizontal reference direction $\varphi=0$ (REF-$DIR_L$)) and in the top drawing the right hearing aid ($HD_R$) is mounted with its microphone direction (MIC-$DIR_R$) tilted in the horizontal plane with a first relatively small tilt angle ($\varphi=\varphi_1$) compared to the reference direction ($\varphi=0$) (REF-$DIR_L$), and in the bottom drawing the right hearing aid ($HD_R$) is mounted with its microphone direction tilted in the horizontal plane with a different, $Q^{th}$, relatively large tilt angle ($\varphi=\varphi_Q$) compared to the reference direction ($\varphi=0$). Again, it is indicated (by bold dots •••) that other tilt angles ($\varphi_q$) may be present between $\varphi_1$ and $\varphi_Q$ (i.e. symbolizing q=1, . . . , Q).

Figure 1C:
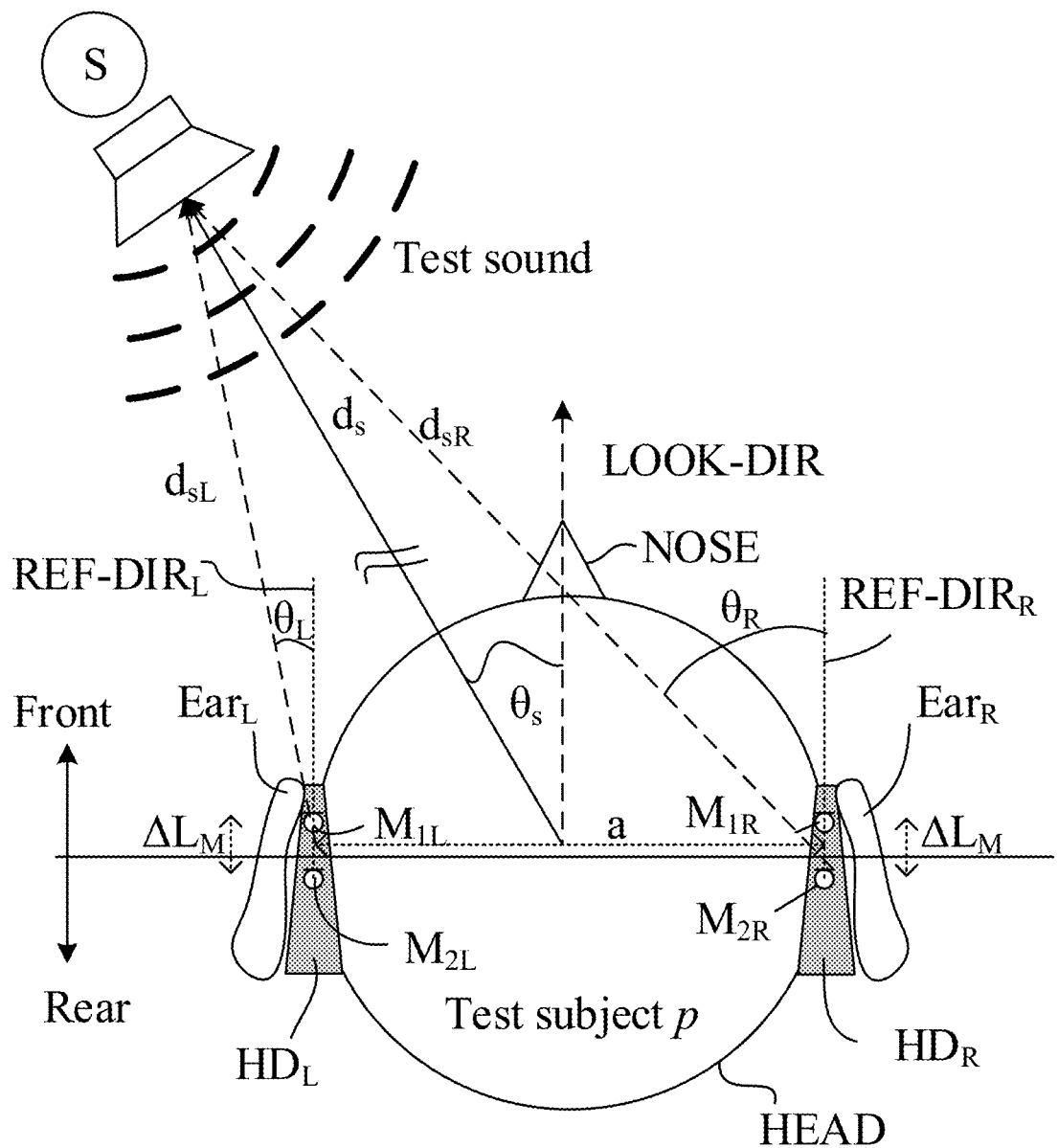

FIG. 1C schematically illustrates a typical geometrical setup of a user wearing a binaural hearing system comprising left and right hearing devices ($HD_L$, $HD_R$), e.g. hearing aids, on his or her head (HEAD) in an environment comprising a (point) source (S) in a front (left) half plane of the user defined by a distance cis between the sound source (S) and the centre of the user's head (HEAD), e.g. defining a centre of a coordinate system. The user's nose (NOSE) defines a look direction (LOOK-DIR) of the user (or Test subject p), and respective front and rear directions relative to the user are thereby defined (see arrows denoted Front and Rear in the left part of FIG. 1C). The sound source S is located at an angle $(-)\theta_s$ to the look direction of the user in a horizontal plane (e.g. through the ears of the user). The left and right hearing devices ($HD_L$, $HD_R$) are located—a distance a apart from each other—at left and right ears ($Ear_L$, $Ear_R$), respectively, of the user (or Test subject p). Each of the left and right hearing devices ($HD_L$, $HD_R$) comprises respective front ($M_{1x}$) and rear ($M_{2x}$) microphones (x=L (left), R (right)) for picking up sounds from the environment. The front ($M_{1x}$) and rear ($M_{2x}$) microphones are located on the respective left and right hearing devices a distance $\Delta L_M$ (e.g. 10 mm) apart, and the axes formed by the centres of the two sets of microphones (when the hearing devices are correctly mounted at the user's ears) define respective reference directions (REF-$DIR_L$, REF-$DIR_R$) of the left and right hearing devices, respectively, of FIGS. 1A, 1B and 1C. The direction to the sound source may define a common direction-of-arrival for sound received at the left and right ears of the user. The real direction-of-arrival of sound from sound source S at the left and right hearing devices will in practice be different ($d_{sL}$, $d_{sR}$) from the one defined by arrow $d_s$ (the difference being larger, the closer the source is to the user). If considered necessary, the correct angles ($\theta_L$, $\theta_R$) may e.g. be determined from the geometrical setup (including angle $\theta_s$, distance $d_s$ and distance a between the hearing devices).

As illustrated in FIG. 1A, 1B, the hearing device, e.g. hearing aids, may not necessarily point towards the position corresponding to the ideal position (REF-DIR). The hearing aid(s) may be tilted by a certain (out of the horizontal plane) elevation angle $\varphi$ (cf. FIG. 1A), and the hearing aids may alternatively or additionally point at a slightly different horizontal direction than anticipated (cf. angle $\varphi$ in FIG. 1B), or a combination thereof (having e.g. a component out of the horizontal plane as well as in the horizontal plane but deviating from the reference direction). The database $\Theta$ (e.g. one for each of the left and right hearing aids ($HD_L$, $HD_R$), e.g. each adapted to and stored in the respective hearing aid) is configured to take account of this in that the different dictionaries $\Delta_p$ comprise acoustic transfer functions (ATF) (for each microphone m) for a multitude of different hearing aid-orientations $\varphi_q$ for the different persons (p), and for each direction/location ($\theta_j$) of the sound source (and as a function of frequency (k)).

As indicated in FIG. 1A, a movement sensor such as an accelerometer or a gyroscope (denoted acc in FIG. 1A) may be used to estimate if the instrument is tilted compared to the horizontal plane (cf. indications of accelerometer acc, and tilt angle $\varphi$ relative to the direction of the force of gravity (represented by acceleration of gravity g) in FIG. 1A on the left hearing device $HD_L$). A magnetometer may help determine if the two instruments are not pointing towards the same direction. Such indication may be used to qualify an indication provided by the personalized hearing aid orientation $\varphi^*$ determined according to the present disclosure.

Figure 1D:
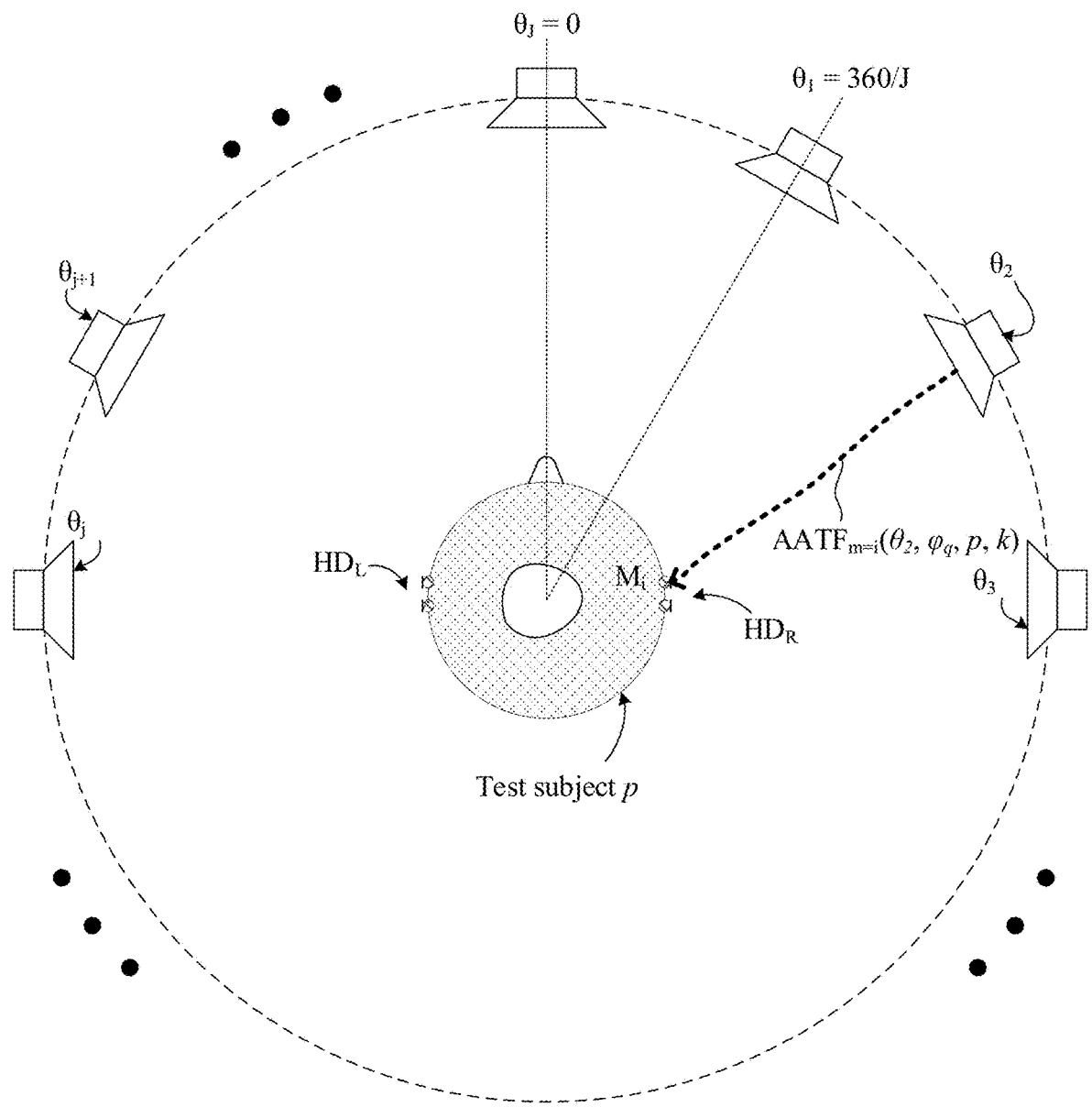

FIG. 1D schematically illustrates a multitude J of examples of a head of a person (p) wearing a hearing aid system comprising left and right hearing aids ($HD_L$, $HD_R$), wherein the left and right hearing aids are mounted with a given hearing aid orientation $\varphi_q$ (e.g. as intended (parallel to a horizontal reference direction $\varphi=0$)), and where the test sound is positioned at a multitude J of directions/locations (here represented by angles $\theta_j$, j=1, . . . , J to sound sources located on a circle around (i.e. a fixed distance from) the test subject p) in a horizontal plane relative to the centre of the persons head. Each angle step is 360°/J, e.g. 30° for J=12, or 15° for J=24. An acoustic transfer function, e.g. an absolute acoustic transfer function $AATF_{m=i}(\theta_2, \varphi_q, p, k)$ is schematically indicated by the dashed arrow from the sound source at $\theta_2$ to microphone $M_i$ (e.g. defined as a reference microphone) of the right hearing aid ($HD_R$) for a given person p, a given hearing aid orientation $\varphi_q$, and a given frequency k. It is assumed that a dictionary $\Delta_p$ of acoustic transfer functions ATF (absolute (AATF) or relative (RATF)) for a given person p comprises values for each microphone (m=1, ..., M), each direction/location of the sound source ($\theta_j$, j=1, ..., J), each hearing aid orientation ($\varphi_q$, q=1, ..., Q) and for all frequencies (k=1, ..., K). The database may comprise a number of (similarly 'equipped') dictionaries $\Delta_p$ for different artificial or natural persons (p=1, ..., P).

Figure 1E:
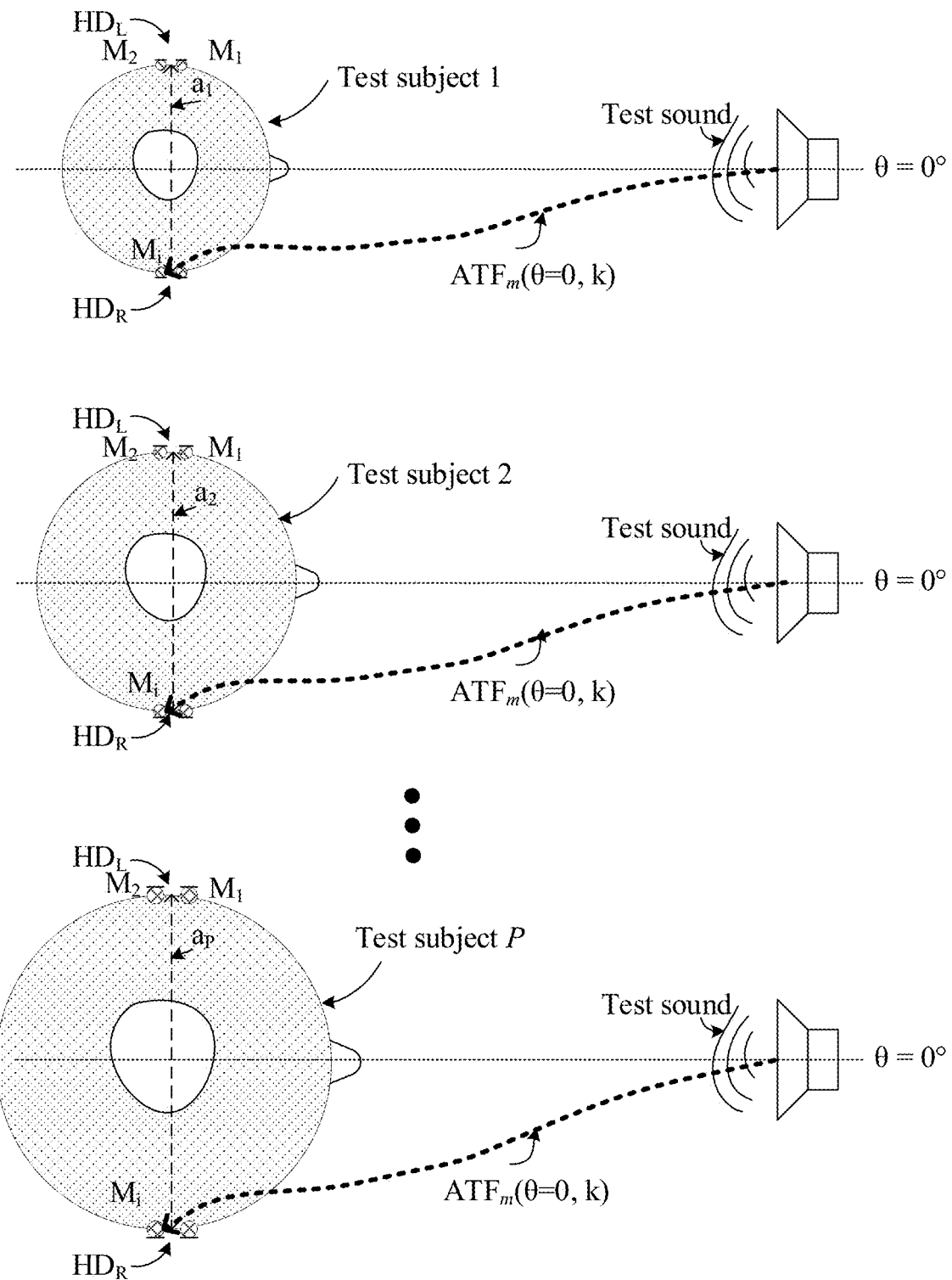
Figure 2A:
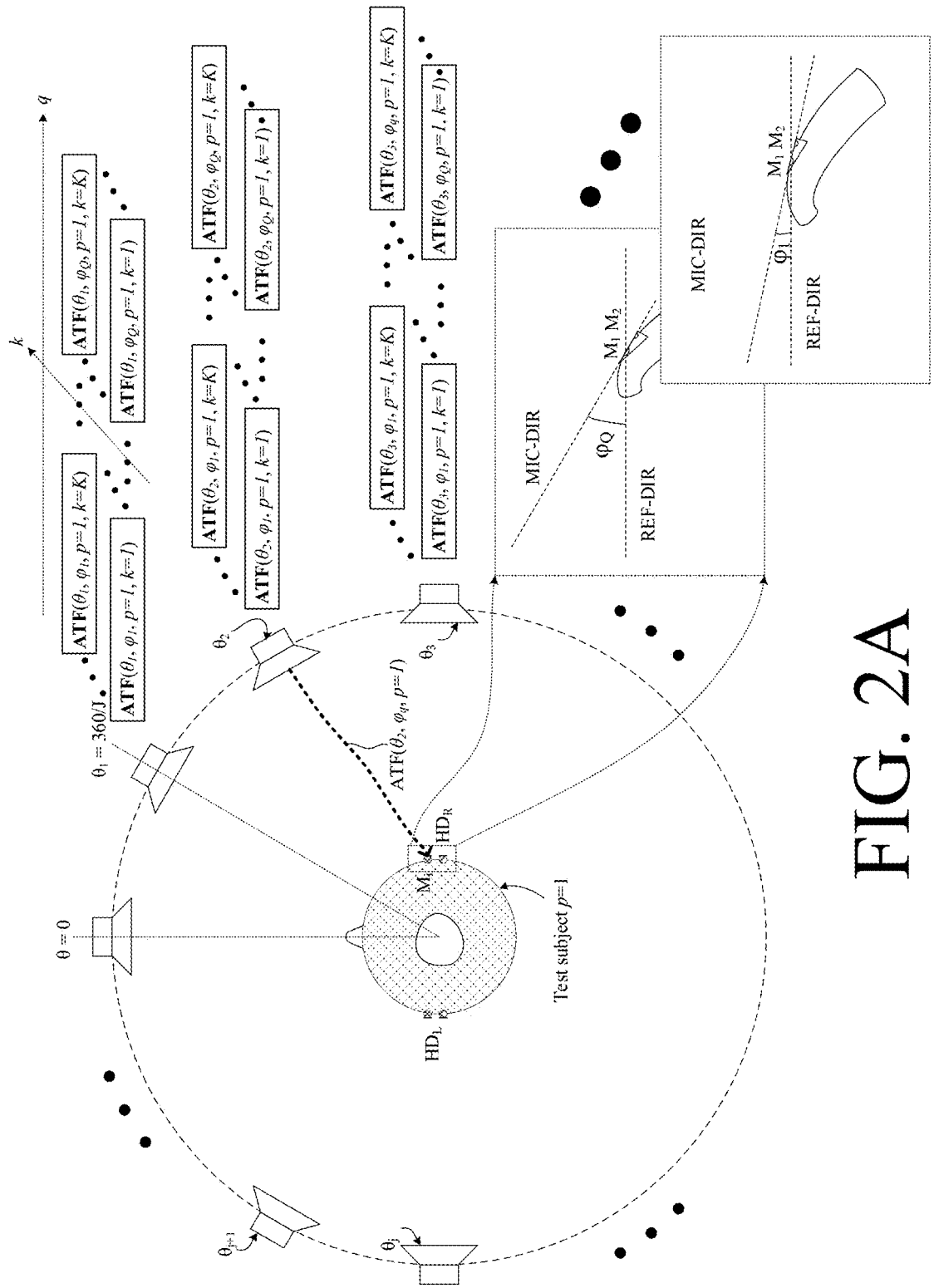
Figure 2B:
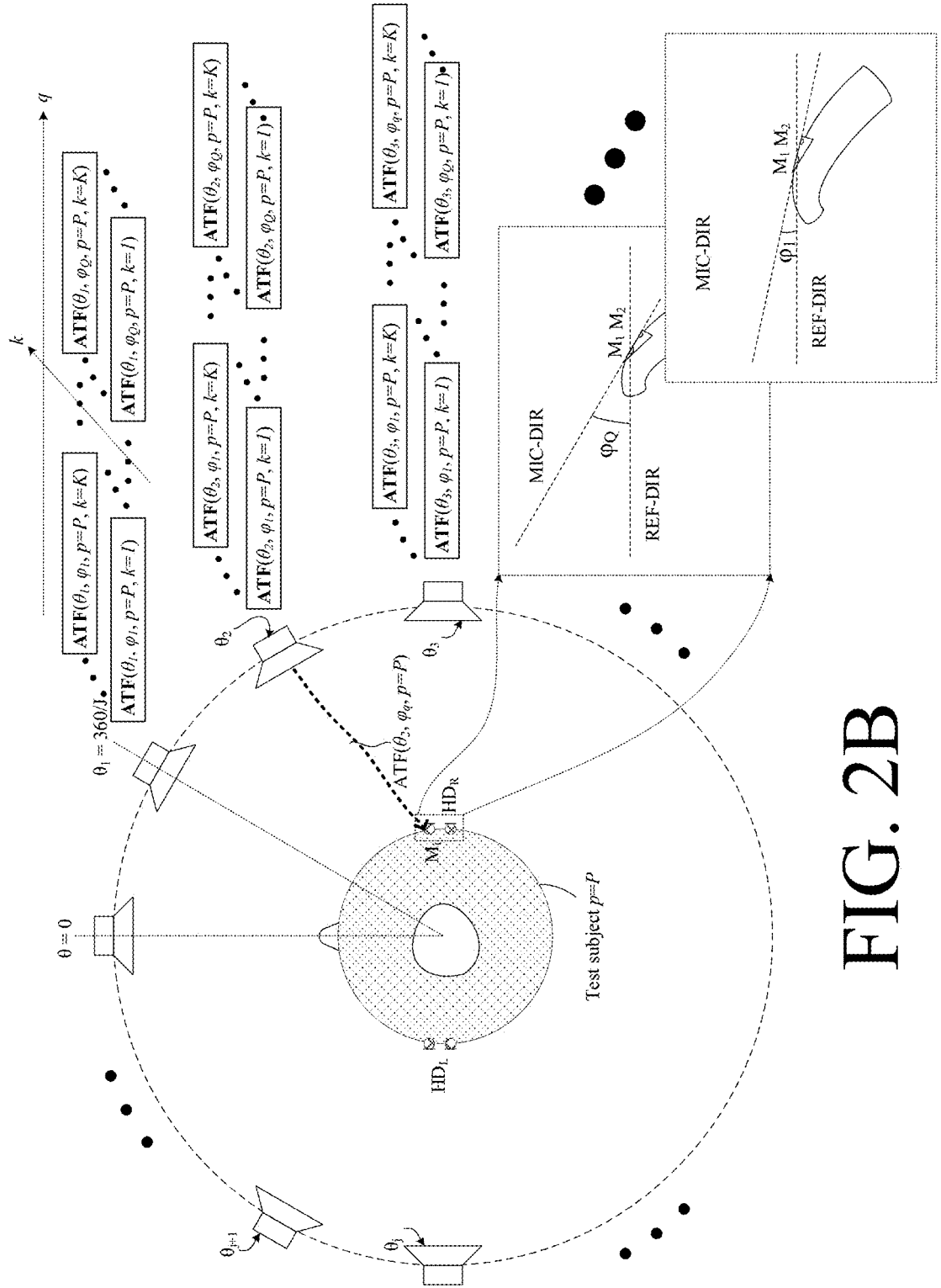

FIG. 1E schematically illustrates a multitude P of examples of heads of a person (p=1, ..., P) wearing a hearing aid system comprising left and right hearing aids ($HD_L$, $HD_R$), wherein the heads of the different persons have different characteristics, here head size $a_p$. Test subject 1 has a relatively smaller head whereas Test subject P has a relatively larger head. As indicated by bold dots •••, acoustic transfer functions (different dictionaries $\Delta_p$) for a number of different persons (Test subjects) may be present in the database Θ (i.e. symbolizing p=1, 2, ..., P). The number of persons may e.g. be larger than 5, e.g. larger than 10, e.g. smaller than 20. In the given examples of FIG. 1E, acoustic transfer functions ATF for a direction/location θ=0° of the sound source (Test sound) to a microphone $M_i$ of the right hearing aid at frequency k is illustrated ($ATF_m$(θ=0, k). It is, however, to be understood that acoustic transfer functions for each microphone (m) (possibly for each hearing aid ($HD_L$, $HD_R$)), each direction/location ($\theta_j$), (optionally) each hearing aid-orientation ($\varphi_q$), each frequency index (k) are recoded and stored in person specific dictionaries ($\Delta_p$) of the database(s). This is illustrated in FIG. 2A, 2B. Hearing aid specific databases ($\Theta_L$, $\Theta_R$) are e.g. stored in each of the left and right hearing aids ($HD_L$, $HD_R$), respectively, or in a commonly accessible device or system, e.g. accessible via an APP of a smartphone or other portable device.

FIG. 2A shows schematically illustrates for a given $1^{st}$ test person (p=1), a combination of measurements of acoustic transfer functions $ATF_m(\theta_j, \varphi_q$, p=1, k) for different microphones (m=1, ..., M) of the right hearing aid ($HD_R$) and/or for a binaural hearing system comprising left and right hearing aids ($HD_L$, $HD_R$), and for each microphone for different directions/locations ($\theta_j$, j=1, ..., J), and for each direction/location for different hearing aid-orientations ($\varphi_q$, q=1, ..., Q), and for each hearing aid orientation for each frequency index (k, k=1, ..., K). ATF in FIGS. 2A (and 2B) refers to a vector comprising elements $ATF_m$, m=1, ..., M. The geometrical measurement setup for different directions/locations is as in FIG. 1D (FIG. 1D illustrating a part of the measurements illustrated by FIG. 2A). The geometrical measurement setup for different hearing aid orientations ($\varphi_q$, q=1, ..., Q) is illustrated by the inserts in the lower right part of FIGS. 2A (and 2B). It is intended that the measurements may be performed individually on microphones of the right hearing aid ($HD_R$) and the left hearing aid ($HD_R$). The results of the measurements may be stored in respective left and right hearing aids (databases $\Theta_L$ and $\Theta_R$) or in a common database $\Theta_C$ stored in one of or in each of the left and right hearing aids, or in another device or system in communication with the left and/or right hearing aids. The data of FIG. 2A are e.g. organized in dictionary $\Delta_{p=1}$.

FIG. 2B schematically illustrates the same as FIG. 2A, but for the $P^{th}$ test person, each person (p, p=1, ..., P) being assumed to have different acoustic characteristics of the head, e.g. different head sizes ($a_r$). The data of FIG. 2A are e.g. organized in dictionary $\Delta_p$=P.

It is assumed that the same acoustic transfer functions $ATF_m(\theta_j, \varphi_q$, p=p', k) for possible further persons p' 'between' person 1 (FIG. 2A) and person P (FIG. 2B) are measured and stored in the respective databases ($\Theta_L$, $\Theta_R$, $\Theta_C$). The direction to or location of the sound source relative to the hearing aid (microphone system or microphone) is symbolically indicated by symbol $\theta_j$ and shown in FIGS. 2A, 2B (and 1C, 1D) as an angle in a horizontal plane, e.g. a horizontal plane through the ears of the person or user (when the person or user is in an upright position). It may however also indicate a location, e.g. in a horizontal plane, e.g. ($\theta_s$, $d_s$) (as in FIG. 1C) or out of a horizontal plane (e.g. x, y, z). The acoustic transfer functions ATF stored in the database(s) may be or represent absolute acoustic transfer functions AATF or relative acoustic transfer functions RATF.

Figure 3:
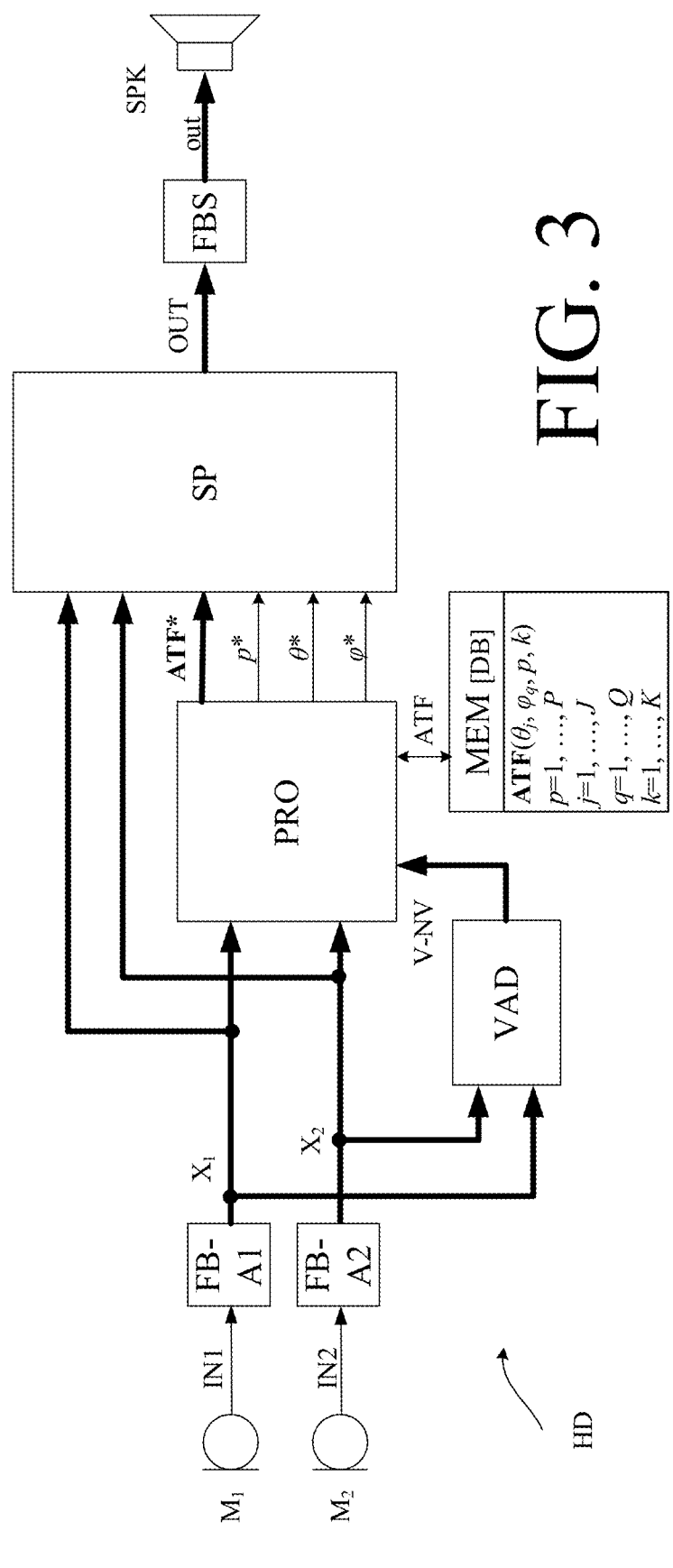

FIG. 3 shows an exemplary block diagram of a hearing aid (HD) according to the present disclosure. The hearing aid (HD) may e.g. be configured to be worn on the head at or in an ear of a user (or be partly implanted in the head at an ear of the user). The hearing aid comprises a microphone system comprising a multitude of M of microphones (here two $M_1$, $M_2$), e.g. arranged in a predefined geometric configuration, in the housing of the hearing aid. The microphone system is adapted to pick up sound from the environment and to provide corresponding electric input signals $x_m$(n), m=1, 2, where n represents time. The environment sound at a given microphone may comprise a mixture (in various amounts) of a) a target sound signal $s_m$(n) propagated via an acoustic propagation channel from a direction to or a location (θ) of a target sound source to the $m^{th}$ microphone of the hearing aid when worn by the user, and b) additive noise signals $v_m$(n) as present at the location of the $m^{th}$ microphone. The acoustic propagation channel is modeled as $x_m(n)=s_m(n)h_m(\theta)+v_m(n)$, wherein $h_m(\theta)$ is an acoustic impulse response for sound for that acoustic propagation channel. The hearing aid comprises a processor (PRO) connected to the microphones ($M_1$, $M_2$) receiving electric signals ($X_1$, $X_2$). The electric signals ($X_1$, $X_2$) are here provided in a time frequency representation (k, l) as frequency sub-band signals by respective analysis filter banks (FB-A1, FB-A2). One or more (here both) of the electric signals ($X_1$, $X_2$) are further fed to a voice activity detector (VAD) for estimating a presence or absence of human voice (e.g. speech). The voice activity detector provides a voice activity control signal (V-NV) indicative of whether or not (or with what probability) an input signal comprises a voice signal (at a given point in time). The voice activity control signal (V-NV) is fed to the processor (PRO) for possible use in the estimation of a current acoustic transfer function (ATF). The hearing aid further comprises a database Θ (MEM [DB]) comprising a dictionary $\Delta_p$ of vectors, termed ATF-vectors, whose elements $ATF_m$(θ,p,k), m=1, ..., M, are frequency dependent acoustic transfer functions representing direction- or location-dependent (θ), and frequency dependent (k) propagation of sound from a location (θ) of a target sound source to each of said M (here M=2) microphones, k is the frequency index, k=1, ..., K, where K is a number of frequency bands. The acoustic transfer functions are determined when the microphone system (e.g. a hearing aid device) is mounted on a head at or in an ear of a natural or artificial person (p). The microphone system is preferably mounted on the person in a configuration identical to, or as close as possible to, the configuration of the hearing aid (e.g. a style identical to the style of the hearing aid worn by the user). The dictionary $\Delta_p$ comprises ATF-vectors $ATF_{\theta,p,\varphi}$, for a person (p), for a multitude of different directions or locations $\theta_j$, j=1, ..., J relative to the microphone system, and (optionally) for a multitude of different hearing aid-orientations $\varphi_q$, q=1, ..., Q, on the head of said person (p), for the multitude of different directions or locations $\theta_j$, j=1, ..., J. In FIG. 3, dictionaries $\Delta_p$ for a multitude P of persons are stored in the database. The processor (PRO) is connected to the database (MEM [DB]) and configured to determine personalized ATF-vectors ATF*$_θ$ for the user based on the database Θ, the electric input signals $x_m(n)$, m=1, ..., M, (here m=1, 2) and the model of the acoustic propagation channels. The personalized ATF-vectors ATF* for the user may be determined by a number of different methods available in the art, e.g. maximum likelihood estimate (MLE) methods, cf. e.g. EP3413589A1. Other statistical methods may e.g. include Mean Squared Error (MSE), regression analysis (e.g. Least Squares (LS)), e.g. probabilistic methods (e.g. MLE), e.g. supervised learning (e.g. neural network algorithms). The personalized ATF-vector ATF* for the user may e.g. be determined by minimizing a cost function. The processor (PRO) may be configured—at a given time with given electric input signals—to determine a personalized ATF-vector ATF* for the user as an ATF-vector ATF* (ATF*$_m$(θ*,φ*,p*,k), m=1, ..., M, k=1, ..., K), i.e. an acoustic transfer function (relative or absolute) for each microphone, for each frequency (k). The personalized ATF-vectors ATF*$_θ$ are determined from the dictionary $Δ_p$ and the chosen vector is associated with a specific person p=p*, a specific direction/location $θ_j$=θ* to/of the sound source, and a specific hearing aid-orientation φ*, and may thus provide information about the user's head characteristics, an estimated direction/location φ* to the target sound source, and an estimate of the current orientation $φ_q$=φ* of the hearing aid in question. The processor (PRO) may be configured to present this information to other parts of the hearing aid, e.g. as in FIG. 4 to a signal processor (SP) for applying processing algorithms to one or more signals of the forward path, e.g. a beamforming algorithm. In the embodiment of FIG. 3, the personalized ATF-vector ATF* for the user as well as corresponding values of the specific person p=p*, the specific direction/location $θ_j$=θ* to/of the sound source, and the specific hearing aid-orientation φ* associated with the (current) personalized ATF-vector are fed to the signal processor (SP). The hearing aid may e.g. be configured to log one or more of said personalized parameters (e.g. the person p*). This may be used to get an indication of the head characteristics of the user (if the person p* corresponds to the same p-value when logged over time). The personalized parameters z* (z=p, θ, φ) may e.g. be stored together with a parameter indicating a quality (e.g. a signal to noise ratio (SNR), or an estimated noise level, or a signal level, etc.) of the electric input signals that were used to determine the parameter value(s) in question (see e.g. FIG. 4).

The hearing aid (HD) of FIG. 3 comprises a forward (audio signal) path configured to process the electric input signals (IN1, IN2) and to provide enhanced (processed) output signal for being presented to the user. The forward path comprises the input transducers (here microphones ($M_1$, $M_2$)) respective analysis filter banks (FB-A1, FB-A2), a signal processor (SP), a synthesis filter bank (FBS), and an output transducer (here a loudspeaker SPK) operationally connected to each other.

The processor (PRO) and the signal processor (SP) may form part of the same digital signal processor (or be independent units). The analysis filter banks (FB-A1, FB-A2), the processor (PRO), the signal processor (SP), the synthesis filter bank (FBS), and the voice activity detector (VAD) may form part of the same digital signal processor (or be independent units).

The synthesis filter bank (FBS) is configured to convert a number of frequency sub-band signals to one time-domain signal. The signal processor (SP) is configured to apply one or more processing algorithms to the electric input signals (e.g. beamforming and compressive amplification) and to provide a processed output signal (OUT) for presentation to the user via an output transducer. The output transducer (here a loudspeaker SPK) is configured to convert a signal representing sound to stimuli perceivable by the user as sound (e.g. in the form of vibrations in air, or vibrations in bone, or as electric stimuli of the cochlear nerve).

The hearing aid may comprise a transceiver allowing an exchange of data with another device, e.g. a smartphone or any other portable or stationary device or system. The database Θ may be located in the other device. Likewise, the processor PRO may be located in the other device.

Figure 4:
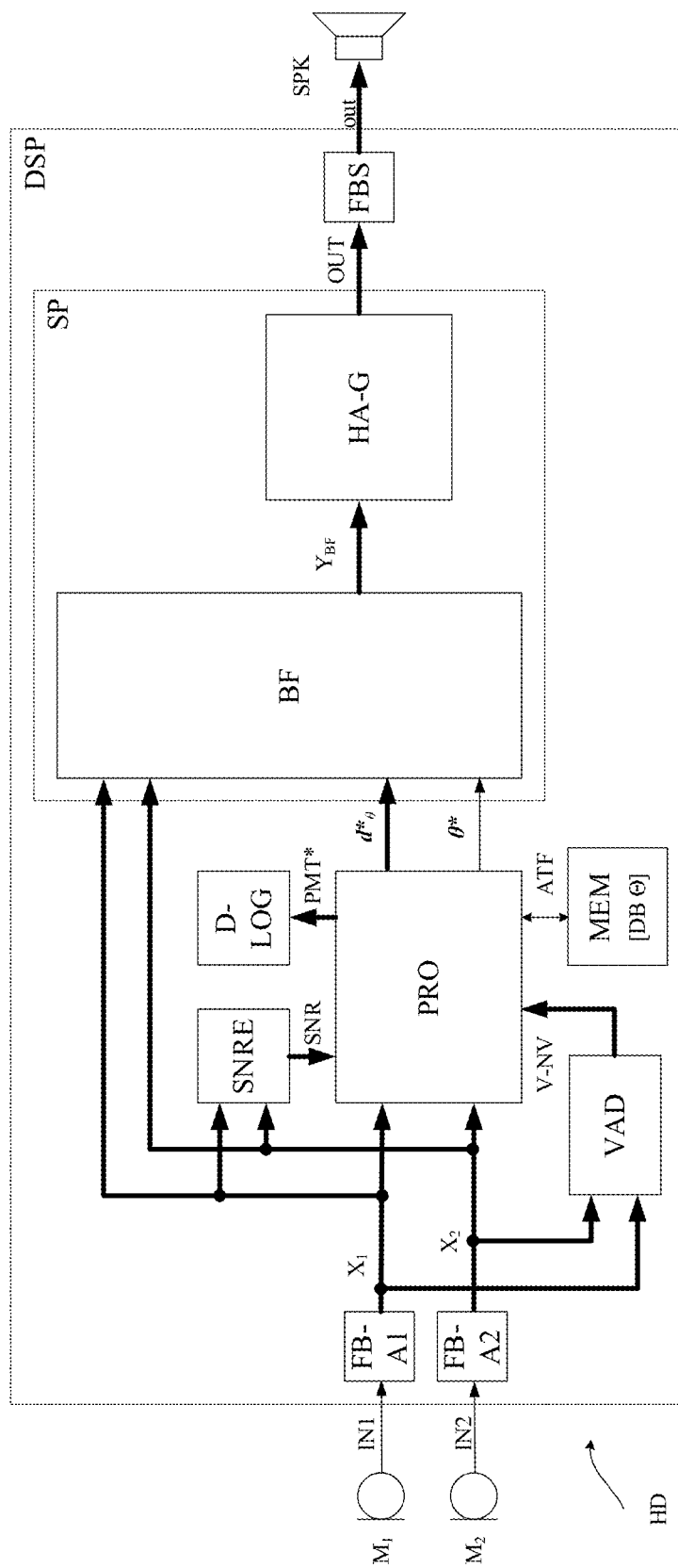
FIG. 4 shows an exemplary block diagram of a hearing aid according to the present disclosure comprising a beamformer with personalized weights.

FIG. 4 shows an exemplary block diagram of a hearing aid (HD) according to the present disclosure comprising a beamformer with personalized weights. The embodiment of IG. 4 is similar to the embodiment of FIG. 3 but additionally comprises an SNR-estimator (SNRE), a datalogger (D-LOG), and a beamformer filter BF. The SNR-estimator (SNRE) is configured to estimate a current signal-to-noise-ratio (SNR) (or an equivalent estimate of a quality of the current electric input signals (IN1, IN2) or of a signal (e.g. a beamformed signal, ($Y_{BF}$)) or signals originating therefrom). The SNR estimate (SNR) is fed to the processor (PRO) (and possibly to other parts of the hearing aid, e.g. to the beamformer and or to the hearing aid gain controller (HA-G). The datalogger (D-LOG) may store personalized parameters PMT* (e.g. the specific person p=p*, the specific direction/location $θ_j$=θ* to/of the sound source, and the specific hearing aid-orientation φ* associated with the (current) personalized ATF-vector ATF* (e.g. absolute or relative acoustic transfer functions (H*$_θ$ or d*$_θ$) together with a parameter indicating a quality (e.g. a signal to noise ratio (SNR), or an estimated noise level, or a signal level, etc.) of the electric input signals that were used to determine the parameter value(s) in question. The datalogger (D-LOG) receives the personalized parameters PMT* from the processor (PRO). The personalized parameters PMT* may be qualified using the SNR estimate, so that only personalized parameters determined at an SNR above a threshold value are logged (e.g. stored) in the data logger (D-LOG). The processor (PRO) feeds the personalized acoustic transfer function (here the relative acoustic transfer function (d*$_θ$) and optionally the current direction/location ($θ_j$=θ*) associated therewith) determined for the current acoustic situation (as reflected by the electric input signals (IN1, IN2), and optionally by the voice activity detector (VAD)) to the signal processor (SP), specifically to the beamformer filter (BF). The beamformer filter (BF) also receives the electric input signals (IN1, IN2) in a time-frequency representation (k,l), where k and l are frequency and time (-frame) indices, respectively. The beamformer filter (BF) provides a beamformed signal $Y_{BF}$ in dependence of the electric input signals ($X_1(k,l)$, $X_2(k,l)$) and the personalized relative acoustic transfer function (d*$_θ$) as e.g. discussed in EP3253075A1. The beamformed signal $Y_{BF}$ is fed to a hearing aid gain controller (HA-G) for applying a frequency dependent gain (e.g. provided by a compression algorithm) to the beamformed signal according to the user's needs, e.g. to compensate for a hearing impairment of the user. The hearing aid gain controller (HA-G) provides a processed signal (OUT) as a frequency sub-band signal that is fed to the synthesis filter bank (FBS) for conversion to the time-domain signal out (as in FIG. 3). The beamformer filter and the hearing aid gain controller (HA-G) form part of the signal processor (SP), as indicated by dotted rectangle denoted SP in FIG. 4. All fully digital functional components of FIG. 4 (FB-A1, FB-A2, VAD, PRO, SNRE, D-LOG, BF, HA-G, FBS and optionally memory (MEM)) may form part of a customized or standard digital signal processor (adapted for audio processing). The memory (MEM) may e.g. be implemented as a separate chip.

The hearing aid (HD), e.g. the processor (PRO), may e.g. be configured to log the estimated personalized ATF-vectors ATF* (e.g. d*$_\theta$) over time and thereby building a database of personalized acoustic transfer functions for different directions/locations. The hearing aid, e.g. the processor (PRO), may e.g. be configured to only log personalized ATF-vectors ATF* that are associated with a quality (e.g. SNR) of the electric input signals is above a certain threshold value. In case the logged (possibly qualified by a signal quality parameter) personalized parameter p* is consistently equal to a specific value $p_u$ of p, the dictionary $\Delta_{pu}$ of ATF-vectors associated with that person ($p_u$) may be used by the hearing aid instead of the proposed estimation scheme. The hearing aid, e.g. the processor (PRO), may be configured to perform the transition itself in dependence of the logged data and a transition criterion (e.g. regarding the number of stored directions/locations for which personalized acoustic transfer functions are stored, and/or regarding a minimum time over which the personalized ATF-vectors ATF* have been logged and/or regarding the quality of the estimated ATF-vectors).

Figure 5A:
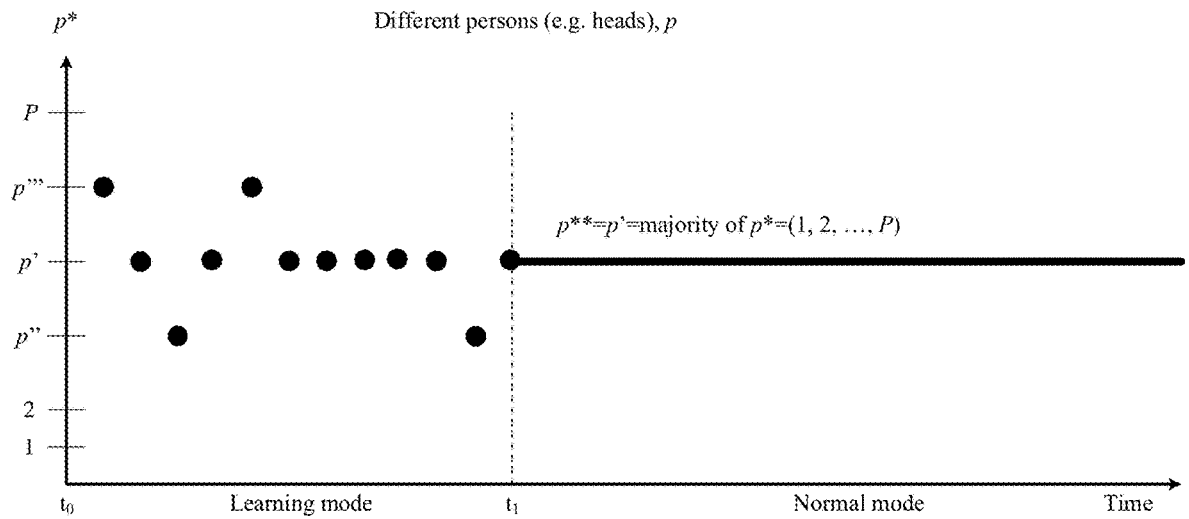
FIG. 5A shows a learning mode for determining the optimal head-and-torso characteristics from the set of candidate head-and-torso characteristics ('person') in a dictionary, and a subsequent normal mode wherein the optimal person-specific head-and-torso-characteristics ('person') determined in the learning mode is fixed.
Figure 5B:
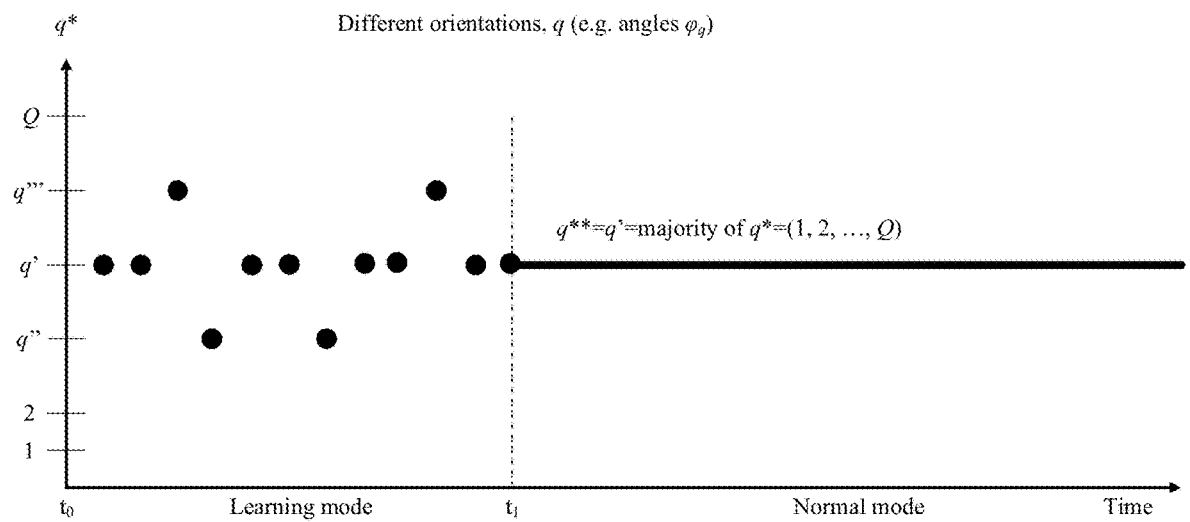
FIG. 5B shows a learning mode for determining an optimal (representation of the current) orientation of the hearing aid on the user's head and a subsequent normal mode wherein the optimal orientation determined in the learning mode is fixed.

FIG. 5A shows a learning mode for determining an optimal person (p*) (e.g. 'head and torso characteristics') and a subsequent normal mode wherein the optimal person (p**) determined in the duration of the learning mode is fixed. FIG. 5B shows a learning mode for determining an optimal (representation of the current) orientation of the hearing aid on the user's head and a subsequent normal mode wherein the optimal orientation determined in the learning mode is fixed.

The left part of FIGS. 5A and 5B illustrates the learning mode from time t=$t_0$ to time t=$t_1$, i.e. of a duration $\Delta t_{LM}$=$t_1$−$t_0$, e.g. ≤1 day, such as ≤1 hour, e.g. ≤10 minutes. During the learning mode, a relevant acoustic transfer functions for given electric input signals (reflecting a specific acoustic situation) may be determined using all dictionaries $\Delta_p$, p=1, . . . , P, of the database Θ, as disclosed in the present application. This may e.g. be as briefly described in the following.

The following procedure may be followed: For given electric input signals, for each directory $\Delta_p$, p=1, . . . , P, of the database Θ (or physically plausible subset thereof), find the optimal location ($\theta_{j*_p}$) for the given directory (corresponding to a person, p) by determining a cost function for of the locations ($\theta_j$, j=1, . . . , J) (or a subset thereof), and then finally choose the optimum location ($\theta_{j*}$) among the P directories (or a subset thereof) as the location ($\theta_{j*}$) exhibiting the lowest cost function (e.g. maximum likelihood). Thereby an optimal person (p*) (and optionally the hearing aid orientation ($\varphi_{q*}$)) can be automatically estimated (as the person (p) (and optionally the hearing aid orientation ($\varphi_{q*}$)) associated with the directory $\Delta_p$, from which the location ($\theta_{j*}$) having the lowest cost function originates).

The above procedure may be used to determine each of the data points in the learning mode of FIGS. 5A and 5B. The learning mode of operation may e.g. be entered during or after each power-up of the hearing aid system (or on request, e.g. from a user interface).

After the learning mode has been finalized, the person (p) (FIG. 5A) and optionally the hearing aid orientation ($\varphi_{q}$) (FIG. 5B)) associated with the directory $\Delta_p$ most frequently used for estimating the current location ($\theta$*) of the target signal source may be held fixed, at least for a certain amount of time, thereby simplifying the procedure of estimating a current location (or rather the acoustic transfer functions corresponding to the current electric input signals) to a single directory $\Delta_{p**}$ (see 'Normal mode' for t>t1 in the right parts of FIG. 5A, 5B).

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

[Farina, 2000]: Farina, Angelo. "Simultaneous measurement of impulse response and distortion with a swept-sine technique." Audio Engineering Society Convention 108. Paper 5093, Audio Engineering Society, Feb. 1, 2000.
EP3413589A1 (Oticon) Dec. 12, 2018
EP3253075A1 (Oticon) Jun. 12, 2017
EP2928214A1 (Oticon) Jul. 10, 2015

The invention claimed is:

1. A hearing aid system comprising a hearing aid configured to be worn on a head at an ear or in the ear of a user, the hearing aid comprising:

a microphone system comprising a multitude of M of microphones arranged in said hearing aid, where M is larger than or equal to two, the microphone system being adapted for picking up sound from an environment and to provide M corresponding electric input signals $x_m(n)$, $m=1, \ldots, M$, n representing time, the environment sound at a given microphone comprising a mixture of
- a target sound signal $s_m(n)$ propagated via an acoustic propagation channel from a direction to or a location ($\theta$) of a target sound source to the $m^{th}$ microphone of the hearing aid when worn by the user, and
- possible additive noise signals $v_m(n)$ as present at a location of the $m^{th}$ microphone, wherein the acoustic propagation channel is modeled as $x_m(n)=s_m(n)h_m(\theta)+v_m(n)$, and wherein $h_m(\theta)$ is an acoustic impulse response for sound for the acoustic propagation channel;

the hearing aid system comprising:
- a processor connected to said multitude of microphones, and
- a database $\Theta$ comprising a multitude of dictionaries $\Delta_p$, $p=1, \ldots, P$, where p is a person index, of vectors, termed ATF-vectors, whose elements $ATF_m$, $m=1, \ldots, M$, are frequency dependent acoustic transfer functions representing direction- or location-dependent ($\theta$), and frequency dependent (k) propagation of sound from the direction or location ($\theta$) of a target sound source to each of said M microphones, k being a frequency index, $k=1, \ldots, K$, where K is a number of frequency bands, when said microphone system is mounted on a head at an ear or in the ear of a natural or artificial person (p), and wherein each of said dictionaries $\Delta_p$ comprises ATF-vectors for a given person (p) for a multitude of different directions or locations $\theta_j$, $j=1, \ldots, J$, relative to the microphone system; and wherein the processor is configured to, at least in a learning mode of operation, determine personalized ATF-vectors (ATF*) for said user based on said multitude of dictionaries $\Delta_p$ of said database $\Theta$, said electric input signals $x_m(n)$, $m=1, \ldots, M$, and said model of the acoustic propagation channels.

2. The hearing aid system according to claim 1 wherein said frequency dependent acoustic transfer functions ATF comprise absolute acoustic transfer functions AATF.

3. The hearing aid system according to claim 1 wherein said frequency dependent acoustic transfer functions ATF comprise relative acoustic transfer functions RATF.

4. The hearing aid system according to claim 1 wherein each of said dictionaries $\Delta_p$, $p=1, \ldots, P$, of said database $\Theta$ are hearing aid-orientation specific and comprises ATF vectors ($ATF_{\theta,p,\varphi}$) for a multitude of different hearing aid-orientations $\varphi_q$, $q=1, \ldots, Q$, on the head of the given person (p), for said multitude of different directions or locations $\theta_j$, $j=1, \ldots, J$.

5. The hearing aid system according to claim 4, wherein for given electric input signals, the processor is configured to, at least in the learning mode of operation, evaluate each of the dictionaries $\Delta_p$ of AATF or RATF-vectors ($H_{\theta,\varphi,p}$, $d_{\theta,\varphi,p}$) for different persons p, $p=1, \ldots, P$, and for the multitude of different hearing aid-orientations $\varphi_q$, $q=1, \ldots, Q$, on the head of said person (p), that correspond to a candidate direction to or location ($\theta$) for all values of the frequency index k, $k=1, \ldots, K$, and to determine an optimal person (p*) and an optimal hearing aid-orientation ($\varphi_{q^*}$) based thereon.

6. The hearing aid system according to claim 5 configured to enter a normal mode of operation after said learning mode of operation, and wherein the hearing aid system is configured to analyse data of a preceding learning mode to identify the person (p**) among said P persons that most frequently has been determined as the optimal person (p*), and to identify the hearing aid orientation ($\varphi_{q^{}}$) among said Q orientations in the directory $\Delta_{p^{}}$ of AATF or RATF-vectors ($H_{\theta,\varphi,p^{}}$, $d_{\theta,\varphi,p^{}}$) that most frequently has been determined as the optimal hearing aid orientation ($\varphi_{q^*}$), and to use the dictionary $\Delta_p$— of said person (p) and said hearing aid orientation ($\varphi_{q^{}}$) to determine personalized ATF-vectors (ATF*) for said user in said normal mode of operation.

7. The hearing aid system according to claim 1 wherein each of said dictionaries $\Delta_p$ of said database $\Theta$ comprises a set of person- and hearing aid-orientation-specific AATF-vectors $H_{\theta,p,\varphi}$ and/or RATF-vectors $d_{\theta,p,\varphi}$ comprising absolute or relative transfer functions for the given person (p) among a multitude of different persons, $p=1, \ldots, P$, with different heads, and for a multitude of different hearing aid-orientations ($\varphi$) on the head of said given person, and for said multitude of different directions or locations $\theta_j$, $j=1, \ldots, J$.

8. The hearing aid system according to claim 1 wherein said personalized AATF or RATF-vector (H*, d*) for said user is determined for different frequency indices (k) using the same AATF or RATF-vectors ($H_{\theta,p}$, $d_{\theta,p}$, $H_{\theta,p,\varphi}$, $d_{\theta,p,\varphi}$) for some or all frequency indices to estimate a given personalized AATF or RATF-vector (H*, d*).

9. The hearing aid system according to claim 1 wherein the personalized AATF or RATF-vector (H* or d*), respectively, for the user is determined by a statistical method or a learning algorithm.

10. The hearing aid system according to claim 9 wherein the personalized AATF or RATF-vector (H* or d*) for the user is determined by minimizing a cost function.

11. The hearing aid system according to claim 1 configured to log an estimated personalized ATF-vectors (ATF*) over time and thereby building a database of personalized acoustic transfer functions for different directions/locations.

12. The hearing aid system according to claim 1 configured to enter said learning mode of operation during or after a power-up of the hearing aid system, or on request from the user, or if one or more sensors indicate a change in a position of the hearing aid.

13. The hearing aid system according to claim 1, wherein for given electric input signals, the processor is configured to, at least in said learning mode of operation, evaluate each of the dictionaries $\Delta_p$ of AATF or RATF-vectors ($H_{\theta,p}$, $d_{\theta,p}$) for different persons p, $p=1, \ldots, P$, that correspond to a candidate direction to or location ($\theta$) for all values of the frequency index k, $k=1, \ldots, K$, and to determine an optimal person (p*) based thereon.

14. The hearing aid system according to claim 13 configured to enter a normal mode of operation after said learning mode of operation, and wherein the hearing aid system is configured to analyse data of a preceding learning mode to identify the person (p**) among said P persons that most frequently has been determined as the optimal person (p*), and to use the dictionary $\Delta_{p^{}}$ of said person (p) to determine personalized ATF-vectors (ATF*), for said user in said normal mode of operation.

15. The hearing aid system according to claim 13 wherein the processor is configured to select the AATF or RATF vector ($H_{\theta,p}$, $d_{\theta,p}$, $H_{\theta,\varphi,p}$, $d_{\theta,\varphi,p}$) corresponding to a specific person (p), and optionally to a specific hearing aid orientation ($\varphi_q$), that is optimal as the personalized AATF or RATF-vector (H* or d*), respectively, for said user in a given acoustic situation.

16. The hearing aid system according to claim 1 wherein the hearing aid comprises said database $\Theta$.

17. The hearing aid system according to claim 1 wherein the hearing aid comprises said processor.

18. The hearing aid system according to claim 1 comprising a beamformer filter configured to provide a spatially filtered signal based on said electric input signals and beamformer weights, wherein the beamformer weights are determined using said personalized AATF or RATF-vector (H*, d*) for said user.

19. The hearing aid system according to claim 1 comprising an auxiliary device wherein said database is stored, and wherein said hearing aid and said auxiliary device comprise antenna and transceiver circuitry allowing data to be exchanged between them.

20. A method of operating a hearing aid system comprising a hearing aid configured to be worn on a head at an ear or in the ear of a user is provided, the method comprising:

providing by a multitude of microphones a corresponding multitude of electric input signals $x_m(n)$, m=1, ..., M, n representing time, comprising environment sound from an environment of the user, wherein the environment sound of a given one of said multitude of electric input signals comprises a mixture of a target sound signal $s_m(n)$ propagated via an acoustic propagation channel from a direction to or a location ($\theta$) of a target sound source to the $m^{th}$ microphone of the hearing aid when worn by the user, and possible additive noise signals $v_m(n)$ as present at a location of the $m^{th}$ microphone, wherein the acoustic propagation channel is modeled as $x_m(n)=s_m(n)h_m(\theta)+v_m(n)$, and wherein $h_m(\theta)$ is an acoustic impulse response for sound for that acoustic propagation channel, providing, or providing access to, a database $\Theta$ comprising a dictionary $\Delta_p$ of vectors, termed ATF-vectors, whose elements $ATF_m(\theta,p,k)$, m=1, ..., M, are frequency dependent acoustic transfer functions representing direction- or location-dependent ($\theta$), and frequency dependent (k) propagation of sound from the location ($\theta$) of a target sound source to each of said M microphones, k being a frequency index, k=1, ..., K, where K is a number of frequency bands, when said microphone system is mounted on a head at an ear or in the ear of a natural or artificial person (p), and wherein said dictionary $\Delta_p$ comprises ATF-vectors ATF for said person (p) for a multitude of different directions or locations $\theta_j$, j=1, ..., J relative to the microphone system;

providing that the database $\Theta$ comprises a multitude P of dictionaries $\Delta_p$, p=1, ..., P, where p is a person index, said dictionaries comprising ATF-vectors ATF for a corresponding multitude of different natural or artificial persons (p); and processing, at least in a learning mode of operation, said multitude of dictionaries $\Delta_p$ of said database $\Theta$, said electric input signals $x_m(n)$, m=1, ..., M, and said model of the acoustic propagation channels to thereby determine personalized ATF-vectors ATF* for said user.

* * * * *